US011484025B2

(12) United States Patent
Andreasen et al.

(10) Patent No.: US 11,484,025 B2
(45) Date of Patent: Nov. 1, 2022

(54) CRYOPROTECTING AGENT, CRYOPROTECTING AND CRYOPRESERVED COMPOSITIONS, USES THEREOF, AND METHODS OF CRYOPRESERVATION

(71) Applicant: PHARMACOSMOS HOLDING A/S, Holbaek (DK)

(72) Inventors: Hans Berg Andreasen, Holbaek (DK); Lars Christensen, Holbaek (DK); Kim Nordfjeld, Holbaek (DK); Jeppe Skytte, Holbaek (DK); Christian Clausen, Fredensborg (DK); Bjorn Holst, Bagsvaerd (DK)

(73) Assignee: PHARMACOSMOS HOLDING A/S, Holæk (DK)

( * ) Notice: Subject to any disclaimer, the term of this patent is extended or adjusted under 35 U.S.C. 154(b) by 182 days.

(21) Appl. No.: 14/647,745

(22) PCT Filed: Nov. 29, 2013

(86) PCT No.: PCT/EP2013/075128
§ 371 (c)(1),
(2) Date: May 27, 2015

(87) PCT Pub. No.: WO2014/083169
PCT Pub. Date: Jun. 5, 2014

(65) Prior Publication Data
US 2015/0320031 A1    Nov. 12, 2015

Related U.S. Application Data

(60) Provisional application No. 61/740,211, filed on Dec. 20, 2012, provisional application No. 61/731,849, filed on Nov. 30, 2012.

(30) Foreign Application Priority Data

Nov. 30, 2012  (EP) ..................................... 12195033
Dec. 20, 2012  (EP) ..................................... 12198598
Aug. 19, 2013  (EP) ..................................... 13180869

(51) Int. Cl.
*A01N 1/02*    (2006.01)
(52) U.S. Cl.
CPC ................................ *A01N 1/0221* (2013.01)
(58) Field of Classification Search
None
See application file for complete search history.

(56) References Cited

U.S. PATENT DOCUMENTS 7,468,276 B2 * 12/2008 Hariri ...................... A61P 21/00
435/325
7,582,477 B2 *  9/2009 Han ........................ C12N 5/0665
435/325

2008/0176205 A1  7/2008 Shelby
2010/0047213 A1 * 2/2010 Zeitlin ................. A01N 1/0221
424/93.7
2010/0248206 A1  9/2010 Kuypers et al.
2011/0172315 A1  7/2011 Matsumura et al.

FOREIGN PATENT DOCUMENTS

| CN | 1784142 A | 6/2006 | |
| CN | 101215338 A * | 7/2008 | |
| CN | 102337245 B | 10/2012 | |
| EP | 1475434 A1 | 11/2004 | |
| EP | 2484699 | 8/2012 | |
| EP | 2721930 | 4/2014 | |
| EP | 2305792 B1 * | 4/2016 | ............... A61K 9/19 |
| JP | 1984-082301 A | 5/1984 | |
| JP | 1985-129102 A | 7/1985 | |
| JP | 1995-099965 A | 4/1995 | |
| JP | 2007-075540 | 3/2007 | |
| JP | 2012-500021 A | 1/2012 | |
| KR | 2000-0034010 | 6/2000 | |
| KR | 100324351 | 11/2002 | |
| RU | 2416197 C1 | 4/2011 | |
| WO | WO 2004/101758 A2 | 11/2004 | |
| WO | WO 2010/021714 A2 | 2/2010 | |
| WO | 2010124855 | 11/2010 | |
| WO | WO 2013/107797 | 7/2013 | |

OTHER PUBLICATIONS

Sheng et al., Characterization of Dextran, Malvern Instruments, Ltd. 2007, available online at: https://www.kdsi.ru/upload/iblock/ffb/ffbc0dbc3e13158777507a824a1c26b2.pdf.*
Gilmore, Gary L., et al. "Ex vivo expansion of human umbilical cord blood and peripheral blood CD34+ hematopoietic stem cells." Experimental hematology 28.11 (2000): 1297-1305. (Year: 2000).*
Stoddart, Martin J. "Cell viability assays: introduction." Mammalian Cell Viability. Humana Press, 2011. 1-6. (Year: 2011).*
Katkov, Igor I., et al. "DMSO-free programmed cryopreservation of fully dissociated and adherent human induced pluripotent stem cells." Stem cells international 2011 (2011).*
USP Monograph for Dextran 1, accessed on May 31, 2019 at: http://ftp.uspbpep.com/v29240/usp29nf24s0_m23750.html.*
Naaldijk, Yahaira, et al. "Effect of different freezing rates during cryopreservation of rat mesenchymal stem cells using combinations of hydroxyethyl starch and dimethylsulfoxide." BMC biotechnology 12.1 (2012): 49. (Year: 2012).*

(Continued)

*Primary Examiner* — Robert J Yamasaki
(74) *Attorney, Agent, or Firm* — Robin L. Teskin; Baker, Donelson, Bearman, Caldwell & Berkowitz PC

(57) ABSTRACT

The present invention relates to a cryoprotecting agent comprising a cryprotectant being one or more of: dextrin, dextran, isomaltooligosaccharide and derivatives thereof, cryoprotecting and cryopreserved compositions, uses thereof, and methods of cryopreservation.

31 Claims, 11 Drawing Sheets

(56) References Cited

OTHER PUBLICATIONS

Figure 1:
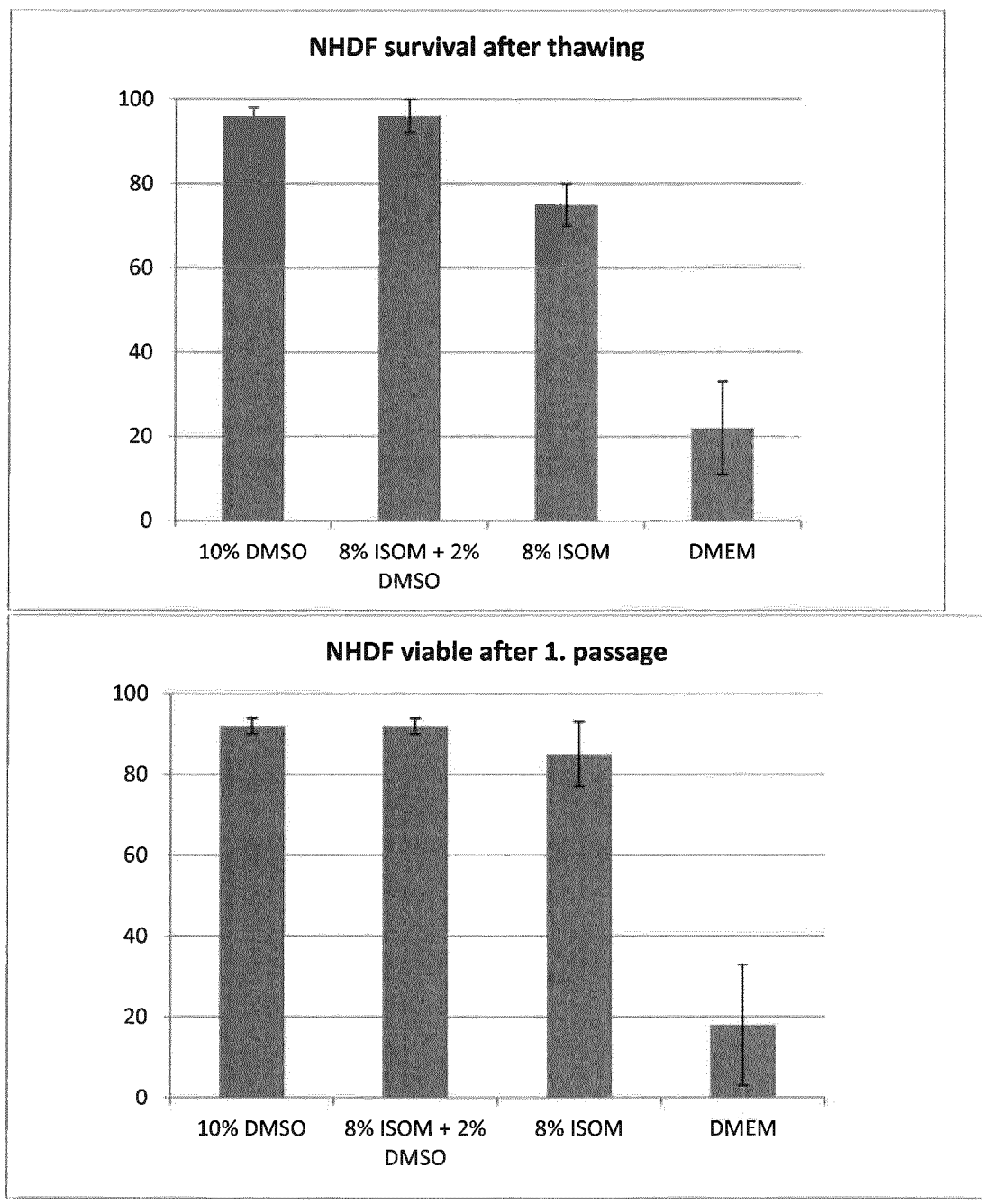

Moreira, Jose L., et al. "Effect of viscosity upon hydrodynamically controlled natural aggregates of animal cells grown in stirred vessels." Biotechnology progress 11.5 (1995): 575-583. (Year: 1995).*
Connor et al., "Cryoprotection of Mammalian Cells in Tissue Culture with Polymers; Possible Mechanisms", Cryobiology 10:488-496 (1973).
Fan et al., "Cryoprotectants for the vitrification of corneal endothelial cell", Cryobiology 58:28-36 (2009).
Schmehl et al., "The Effects of Nonpenetrating Cryoprotectants Added to TEST-Yolk-Glycerol Extender on the Post-thaw Motility of Ram Spermatozoa", Cryobiology 23:512-517 (1986).
Iozep et al., "Synthesis of esters of carboxymethyl dextran", Zhurnal Prikladnoi Khimii, vol. 66(5), pp. 1106-1110, 1993, XP002740261.
Krasnikova et al., "Acylation of Amino Acids with Dextran Derivatives", *Russian Journal of Applied Chemistry*, vol. 77, No. 5, pp. 797-800, 2004, XP055192223.
Slivkin et al., "Synthesis and Antituberculous Activity of the Polymeric Forms of Isoniazid and Streptomycin Based on Carboxymethyldextran Esters", *Pharmaceutical Chemistry Journal*, vol. 33, No. 12, pp. 661-664, 1999, XP055192221.
Written Opinion of the International Preliminary Examining Authority issued Mar. 15, 2016 in International Patent Application No. PCT/EP2015/057047.
International Search Report, International Preliminary Report on Patentability and Written Opinion for International Patent Application No. PCT/EP2013/075128, dated Feb. 3, 2014.
Extended European Search Report on corresponding European Application No. 12195033.1, dated Jun. 27, 2013.
Arora, N., et al., "A Review On the Cryopreservation Technology and Cryoprotectant," *Journal of Pharmacy Research*, 2012, pp. 2087-2090, vol. 5(4).
Ashwood-Smith, M. J., and C. Warby, "Studies on the Molecular Weight and Cryoprotective Properties of Polyvinylpyrrolidone and Dextran with Bacteria and Erythrocytes," *Cryobiology*, 1971, pp. 453-464, vol. 8.
Ashwood-Smith, M. J., et al., "Low-Temperature Preservation Of Mammalian Cells in Tissue Culture with Polyvinylpyrrolidone (PVP), Dextrans, and Hydroxyethyl Starch (HES)," *Cryobiology*, 1972, pp. 441-449, vol. 9.
Cox, M. A., et al., "Historical perspectives and the future of adverse reactions associated with haemopoietic stem cells cryopreserved with dimethyl sulfoxide," *Cell Tissue Bank*, 2012, pp. 203-215, vol. 13.
Echlin, P., et al., "Polymeric cryoprotectants in the preservation of biological ultrastructure," *Journal of Microscopy*, 1977, pp. 239-255, vol. 110.
Eroglu, A., et al. "Intracellular Trehalose Improves the Survival of Cryopreserved Mammalian Cells," *Nature Biotechnology*, Feb. 2000, pp. 163-167, vol. 18.
Halberstadt, M., et al., "Corneal Cryopreservation with Dextran," *Cryobiology*, 2001, pp. 71-80, vol. 43.
Lee, K. S., et al., "Cryoprotectant Effects of Fructo-, Isomalto-, and Galacto-Oligosaccharides on Beef Protein," *J. Korean Soc. Food Sci. Nutr.*, 2001, pp. 565-568, vol. 30(3).
Odavic, R., et al., "Cryoprotection of human bone marrow committed stem cells (CFU-c) by dextran, glycerol and dimethyl sulfoxide," *Experientia*, 1980, pp. 1122-1124, vol. 36.
Richter, W., "Hapten Inhibition of Passive Antidextran Dextran Anaphylaxis in Guinea Pigs. Role of Molecular Size in Anaphylactogenicity and Precipitability of Dextran Fractions," *Int. Arch. Allergy*, 1971, pp. 826-844, vol. 41.
Richter, W., "Minimal Molecular Size of Dextran Required to Elicit Heterologous Passive Cutaneous Anaphylaxis in Guinea Pigs," *Int. Arch. Allergy*, 1972, pp. 252-268, vol. 43.
Rubenstein, P., et al., "Processing and cryopreservation of placental/umbilical cord blood for unrelated bone marrow reconstitution," *Proc. Natl. Acad. Sci. USA*, Oct. 1995, pp. 10119-10122, vol. 92.
Shu, G., et al., "Effect of fructo-oligosaccharide, isomalto-oligosaccharide, inulin and xylo-oligosaccharide on survival of *B. bifidum* during freeze-drying," *Advanced Materials Research*, 2012, pp. 454-457, vol. 382.
De Belder, A. N., "Dextran," *Handbooks from Amersham BioSciences*, 18-1166-12, Edition AA, 2003, pp. 35.
Baust JM, Snyder KK, VanBuskirk RG, Baust JG. Changing paradigms in biopreservation. Biopreservation and biobanking. Mar. 1, 2009 ;7(1 ):3-12.
"Cryopreservation of Cells", <https://online.uspnf.com/uspnf/document/GUID-385409E5-A2E9-4622-9129-OB7387F71AB2_1_en-US> downloaded Sep. 27, 2018; 9 pages.
Haastrup et al. "DMSO (Me2SO) concentrations of 1-2% in combination with pentaisomaltose are effective for cryopreservation of T cells." Transfusion and Apheresis Science. Apr. 16, 2021:103138.
Shu et al. "Hematopoietic stem cell transplantation with cryopreserved grafts: adverse reactions after transplantation and cryoprotectant removal prior to infusion." Bone marrow transplantation. Apr. 2014;49(4):469.
Svalgaard et al. "Cryopreservation of adipose-derived stromal/stem cells using 1-2% Me2SO (DMSO) in combination with pentaisomaltose: An effective and less toxic alternative to comparable freezing media." Cryobiology. Oct. 1, 2020;96:207-13.
Svalgaard et al. "Pentaisomaltose, an alternative to DMSO. Engraftment of cryopreserved human CD34+ cells in immunodeficient NSG mice." Cell transplantation. Sep. 2018;27(9):1407-12.
Svalgaard et al. "Low-molecular-weight carbohydrate Pentaisomaltose may replace dimethyl sulfoxide as a safer cryoprotectant for cryopreservation of peripheral blood stem cells." Transfusion. May 2016;56(5): 1088-95.
"Pharmacosmos Launches cell therapy market offensive", <https://medwatch.com/News/Pharma_Biotech/article13086568.ece> downloaded Nov. 3, 2021; 3 pages.
Halle et al. "Uncontrolled-rate freezing and storage at—80° C., with only3. 5-percent DMSO in cryoprotective solution for 109 autologous peripheral blood progenitor cell transplantations." Transfusion. May 2001;41(5):667-73.
Database CA [Online] Chem. Abs.; Park, Kwan Hwa et al.: "Cryoprotectant containing fructo-oligosaccharide, isomalto-oligosaccharide, or galactooligosaccharide for surimi", XP002698458, STN Database accession No. 2002:137566; & KR 2000 034 010 A.
Shu, Guo Wei, et al. "Effect of fructo-oligosaccharide, isomalto-oligosaccharide, inulin and xylo-oligosaccharide on survival of B. bifidum during freeze-drying." Advanced Materials Research. vol. 382. Trans Tech Publications Ltd, 2012.

* cited by examiner

Fig. 8
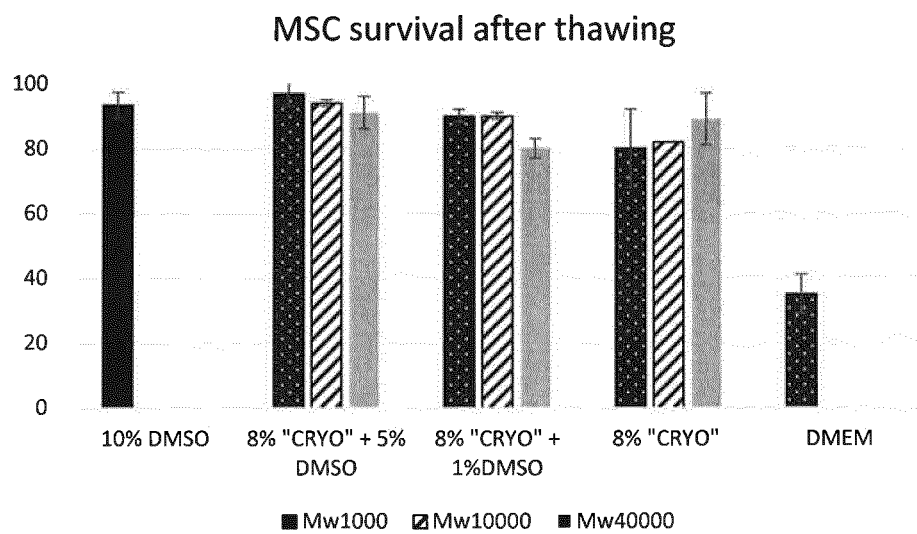
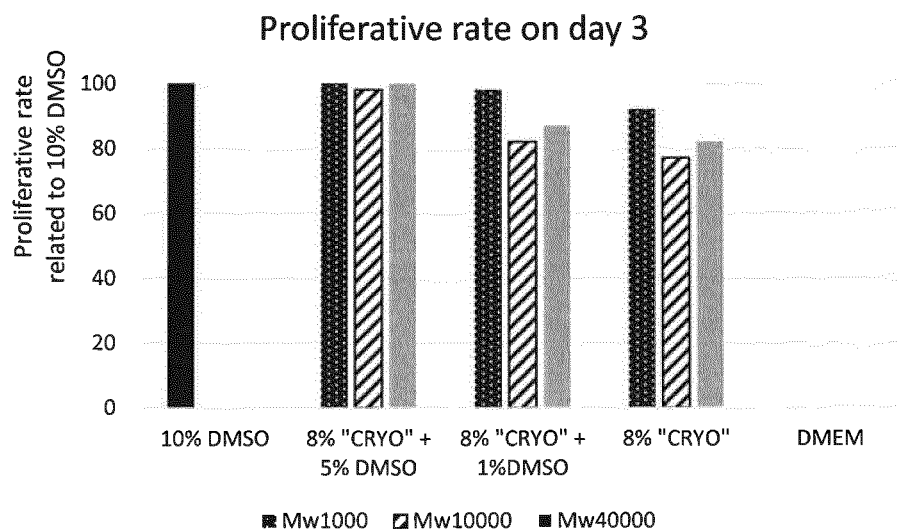

CRYOPROTECTING AGENT, CRYOPROTECTING AND CRYOPRESERVED COMPOSITIONS, USES THEREOF, AND METHODS OF CRYOPRESERVATION

CROSS-REFERENCE TO RELATED APPLICATIONS

This application is a national stage filing under 35 U.S.C. 371 of PCT/EP2013/075128, filed Nov. 29, 2013, which International Application was published by the International Bureau in English on and which claims the benefit of U.S. Provisional Patent Application No. 61/731,849, filed Nov. 30, 2012 and U.S. Provisional Patent Application No. 61/740,211, filed Dec. 20, 2012, which applications claim priority to EP Application No. 12195033.1, filed Nov. 30, 2012; EP Application No. 12198598.0, filed Dec. 20, 2012; and EP Application No. 13180869.3, filed Aug. 19, 2013, all of which are hereby incorporated herein in their entirety by reference.

FIELD OF THE INVENTION

The present invention relates to a cryoprotectant, a cryoprotecting agent, cryoprotecting compositions, cryopreserved compositions, uses thereof, and methods of cryopreservation.

BACKGROUND OF THE INVENTION

Cryopreservation of viable biological samples such as cells, tissues or organs, which have been harvested from a donor source, is of great importance and utility in the scientific and medical communities. Cryopreservation is generally a process where a sample, for example cells or tissue, is preserved by cooling to sub-zero temperatures, typically 77 K (=196° C., the boiling point of liquid nitrogen). At these low temperatures, any biological activity, including the biochemical reactions that would cause cell death, is effectively stopped. Cryopreservation techniques are routinely used for long-time preservation of water-bearing or aqueous materials such as cells and tissues of plants and animals. It is known that upon freezing these materials, ice crystals form, resulting in uneven concentrations of solutes and contaminants excluded by water molecules, called 'freeze concentration'. In order for the cells or tissues to be preserved, cryoprotectant solutions are typically used to prevent damage due to freezing during the cooling or thawing process. For cryopreservation to be useful, the preserved sample should retain it's integrity and viability to a reasonable level at the time of harvest. Thus, the process of preserving the sample should preferably not, in itself, severely damage or destroy for example the cells or tissue architecture.

In conventional cryopreservation techniques, the sample is harvested, placed in a storage solution, and then preserved by freezing. When the sample is to be used, it is thawed, and for example cells taken from human donor sources are brought back to the normal human body temperature (i.e., approximately 37° C.) and then placed in a cell culture medium. Cryopreservation protocols subject the cells to a multitude of stresses and insults throughout the process of cell harvesting, freezing, and thawing. These stresses and insults can cause irreversible damage to the cell.

Dextran has been used as a cryoprotective agent for human, animal and plant cells (Odavic, R. et al. Experientia 36, 1122 (1980), Ashwood-Smith, M. J. et al. Cryobiology 9, 441 (1972) and Echlin, P. et al. J. Microsc. (Oxford) 110, 239 (1977)). A mixture of 5% methyl sulphoxide and 9% Dextran 70 was found to afford optimal cryoprotection of human bone marrow committed stem cells (Dextran, Handbook from Amersham BioSciences, 18-1166-12, Edition AA, page 35). Dextran, glycerol and dimethyl sulfoxide (DMSO), alone or in combination, have been investigated for cryoprotection of human bone marrow cells (Odavic, R. et al. Experientia 36, 1122 (1980)). A significantly better protection against freezing injury was obtained by 9% Dextran 70 in combination with 3 or 5% DMSO, and also with 5 or 10% DMSO alone, than with either 15% glycerol or 9% dextran with 1% DMSO. Dextran 40 is known (Proc. Nati. Acad. Sci. USA, Vol. 92, pp. 10119-10122, October 1995, Medical Sciences) for cryopreservation of placental/umbilical cord blood in a combination of 50% DMSO in 5% (w/v) Dextran 40.

Shu Guowei et al describes in Advanced Materials Research, Trans Tech Publications Ltd., Vol. 328 (2012), pp 454-457 the effect of fructo-oligosaccharide, isomalto-oligosaccharide, inulin and xylo-oligosaccharide on survival of *B. bifidium* during freeze-drying. Kwan Hwa Park et al. describes in Database CA, XP 002698458 a cryoprotectant containing fructooligosaccharide, isomaltooligosaccharide or galactooligosaccharide for surimi. In J. Korean Soc. Food Sci. Nutr., Vol. 30(3) (2001), pp 565-568, the effects of a cryoprotectant of fructooligosaccharide, isomaltooligosaccharide and galactooligosaccharide on beef protein is described.

Conventional cryoprotectants are glycols (alcohols containing at least two hydroxyl groups), such as ethylene glycol, propylene glycol, and glycerol. Ethylene glycol is commonly used as automobile antifreeze, and propylene glycol has been used to reduce ice formation in ice cream. Dimethyl sulfoxide (DMSO) is also regarded as a conventional cryoprotectant. Glycerol and DMSO have been used for decades by cryobiologists to reduce ice formation in sperm and embryos that are preserved in liquid nitrogen (−196° C.). Among these known cryoprotecting agents, DMSO is considered the most effective and frequently adopted, but it is physiologically toxic and known to cause high blood pressure, nausea and vomiting if transfused to a recipient with the cells or for personnel handling it unless precautions are taken. Cox et al (Cell Tissue Bank (2012) 13:203-215) identified by a retrospective review of published literature several hundred adverse reactions (e.g. nausea, chills, cardiac arrhythmias, neurological symptoms and respiratory arrest) associated with the transplantation of stem cells cryopreserved with dimethyl sulfoxide. Further, the toxicity of DMSO tends to debilitate the cells' survival rates and/or functions, including genomic alterations after the thawed cells are cultured or transfused into a recipient's body. The toxicity of DMSO thus also affects how long the cells may be exposed to DMSO during handling.

Thus, there is still a need for a cryoprotecting agent for protecting a sample such as a biological sample during freezing as a replacement for other cryoprotectants such as DMSO or as a supplement to such other cryoprotectants to reduce the concentration needed thereof, preferably to non-toxic concentrations, which at the same time have the necessary protective effects and low toxicity.

OBJECT OF THE INVENTION

It is an object of embodiments of the invention to provide a cryoprotectant as a replacement for other cryoprotectants such as DMSO or as a supplement to such other cryoprotectants to reduce the concentration thereof, preferably to non-toxic concentrations, which cryoprotectant have the necessary protective effects with regard to preserving as much functionality of the cryopreserved sample during cryopreserving. It is a further object of embodiments of the invention to provide a cryoprotectant having a low toxicity for the personnel handling the cryoprotectant and for the biological samples, whereby the time that the sample can be in contact with the cryoprotectant without being damaged is prolonged, the necessity for washing of samples is reduced, and preferably, if desired, making it possible to return the sample to where it was taken from or to a recipient without having to separate the sample from the cryoprotectant. It is a further object of embodiments of the invention to provide a cryoprotectant which is effective as a cryoprotectant for a sample selected from the group consisting of organs, cells and tissues such as selected from the group consisting of mammalian organs, mammalian cells, and mammalian tissues. It is a further object of embodiments of the invention to provide a cryoprotectant which is effective as a cryoprotectant for a sample to be transplanted such as an organ, cells or tissues. It is a further object of embodiments of the invention to provide a cryoprotectant which is effective as a cryoprotectant of for example cells and result in an acceptable viability of said cells. It is a further object of embodiments of the invention to provide a cryoprotectant which is effective as a cryoprotectant of for example organs and result in an acceptable physical functionality of said organs. It is a further object of embodiments of the invention to provide a cryoprotectant which is effective as a cryoprotectant of for example tissues and result in an acceptable physical functionality of said tissues.

SUMMARY OF THE INVENTION

It has been found by the present inventor(s) that a cryoprotecting agent comprising one or more cryoprotectants selected from the group consisting of dextrin, dextran, isomaltooligosaccharide, and derivatives thereof, and a) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide, and derivatives thereof in said agent, or b) wherein said cryoprotectant has a weight average molecular weight ($M_w$) of between 300 and 9,500 Da such as between 300 and 7,500 Da, or c) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said agent, and said cryoprotectant has a weight average molecular weight ($M_w$) of between 300 and 9,500 Da, is very useful as a cryoprotectant. Compared to the previously used dextran materials of higher molecular weight such as Dextran 40 (40,000 Da) and Dextran 70 (70,000 Da), the cryoprotecting agent comprising above described cryoprotectant has a lower viscosity due to the lower molecular weight and may thus be pre-prepared in a high concentration making it possible to add a sample already in a solution and still obtain a composition comprising both cryoprotectant and sample in a concentration suitable for cryopreservation. Furthermore, molecules with lower molecular weight are generally less immunogenic than molecules with high molecular weight. Dextran 1 is known as a hapten inhibitor that reduces the risk for anaphylactic reactions when administering dextran and is thus used as pre-injection before injection of dextrans with higher molecular weight such as Dextran 40 (40,000 Da) and Dextran 70 (70,000 Da). Dextran 1 has also been documented in studies by Richter et al (Int. Arch. Allergy 43:252-268 (1972) and Int. Arch. Allergy 41:826-844 (1971)) to have a very low immunological potential in humans. Furthermore, it has been shown in the examples that cryopreservation with the cryoprotectant as described herein provides a better protection of functionality after cryopreservation measured as viability of the tested cells than with dextrans having a higher molecular weight.

So, in a first aspect the present invention relates to a cryoprotecting agent comprising one or more cryoprotectants selected from the group consisting of dextrin, dextran, isomaltooligosaccharide, and derivatives thereof, and a) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide, and derivatives thereof, or b) wherein said cryoprotectant has a weight average molecular weight ($M_w$) of between 300 and 9,500 Da such as between 300 and 7,500 Da or, c) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said cryoprotecting agent, and said cryoprotectant has a weight average molecular weight ($M_w$) of between 300 and 9,500 Da.

In a further aspect, the present invention relates to a cryoprotecting agent comprising a cryoprotectant selected from the group consisting of isomaltooligosaccharide and derivatives thereof having a weight average molecular weight ($M_w$) of between 300 and 1,650 Da, such as between 850 and 1,650 Da.

In a further aspect, the present invention relates to the use of a cryoprotectant as described herein for cryopreserving a sample, wherein said sample is selected from the group consisting of organs, cells and tissues.

In a further aspect, the present invention relates to a cryopreservation composition comprising a cryoprotecting agent as described herein, which cryopreservation composition further comprises a sample to be cryopreserved, wherein said sample is selected from the group consisting of organs, cells and tissues.

In a further aspect, the present invention relates to a cryopreserved composition comprising a cryoprotecting agent as described herein, which cryopreserved composition further comprises a sample which has been cryopreserved, wherein said sample is selected from the group consisting of organs, cells and tissues.

In a further aspect, the present invention relates to a method of cryopreserving a sample, comprising the steps of bringing a sample to be cryopreserved into contact with a cryoprotecting agent as described herein to obtain a cryopreservation composition and subsequently reducing the temperature of the cryopreservation composition to a cryopreservation temperature, wherein said sample is selected from the group consisting of organs, cells and tissues.

In a further aspect, the present invention relates to a method of cryopreserving a cryopreservation composition as described herein by bringing the composition to a cryopreservation temperature.

In a further aspect, the present invention relates to the use of a cryoprotecting agent as described herein for cryopreserving a sample, wherein said sample is selected from the group consisting of organs, cells and tissues.

In a further aspect, the present invention relates to the use of a cryoprotecting agent as described herein for cryopreserving a sample for transplantation.

In a further aspect, the present invention relates to the use of a cryopreservation composition as described herein for cryopreserving a sample by reducing the temperature of said composition to a cryopreservation temperature, wherein said sample is selected from the group consisting of organs, cells and tissue.

LEGENDS TO THE FIGURE

FIG. 1 shows survival of NHDFs after thawing and viability after 1. passage in respectively 1) 10% DMSO, 2) 8% isomaltooligosaccharide 1 (ISOM) and 2% DMSO, 3) 8% isomaltooligosaccharide 1 (ISOM) and 4) DMEM as described in Example 2.

Figure 2:
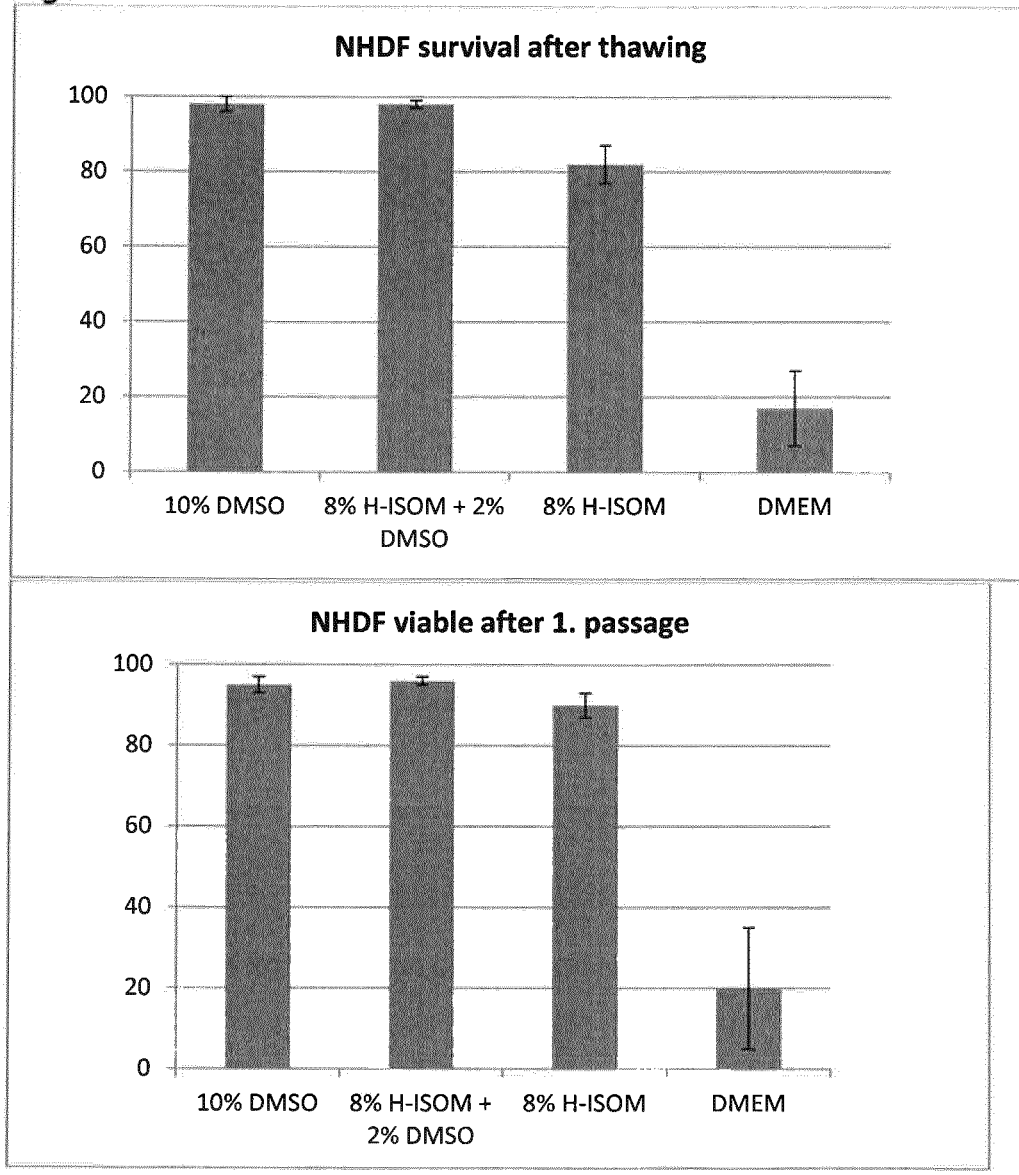

FIG. 2 shows survival of NHDFs after thawing and viability after 1. passage in respectively 1) 10% DMSO, 2) 8% hydrogenated isomaltooligosaccharide 1 (H-ISOM) and 2% DMSO, 3) 8% hydrogenated isomaltooligosaccharide 1 (H-ISOM) and 4) DMEM as described in Example 2.

Figure 3:
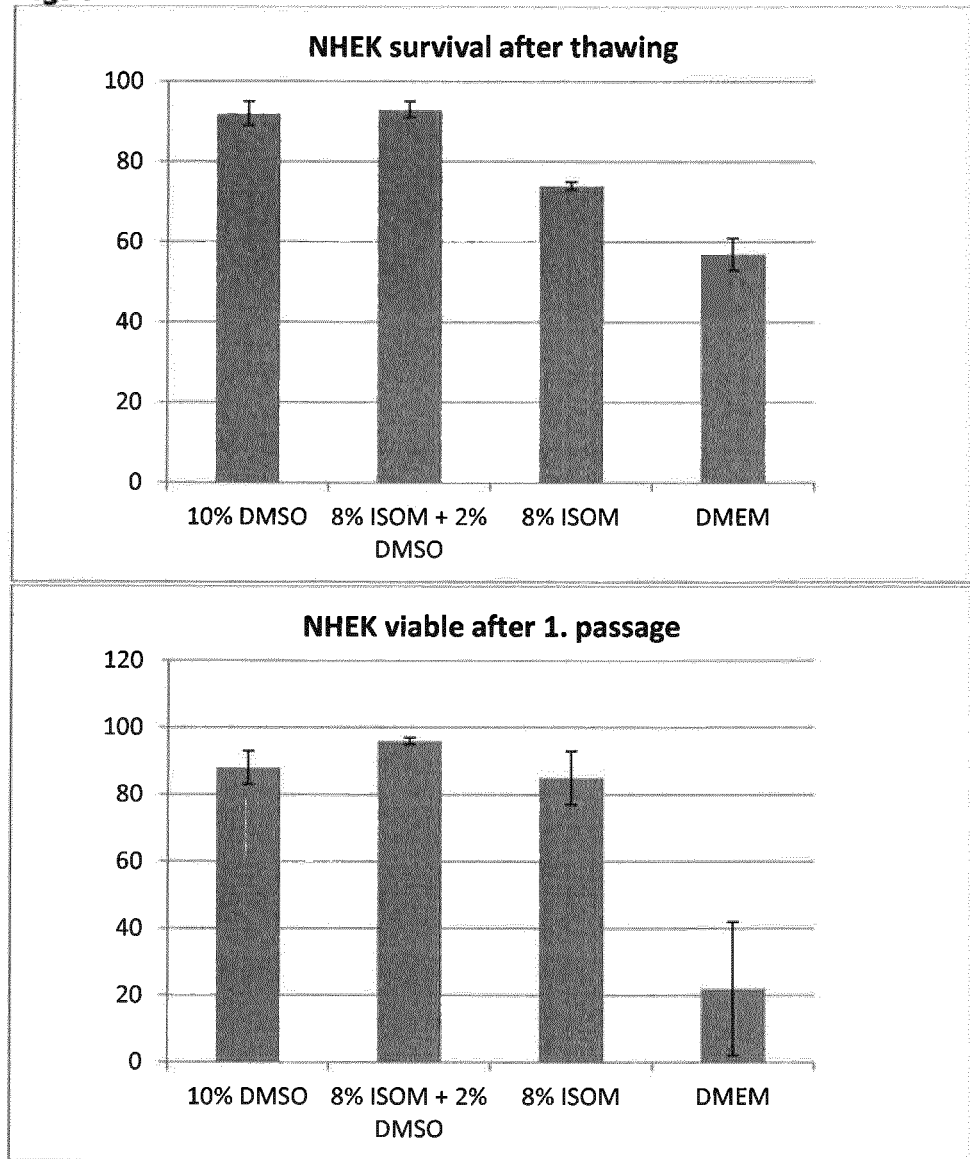

FIG. 3 shows survival of NHEKs after thawing and viability after 1. passage in respectively 1) 10% DMSO, 2) 8% isomaltooligosaccharide 1 (ISOM) and 2% DMSO, 3) 8% isomaltooligosaccharide 1 (ISOM) and 4) DMEM as described in Example 3.

Figure 4:
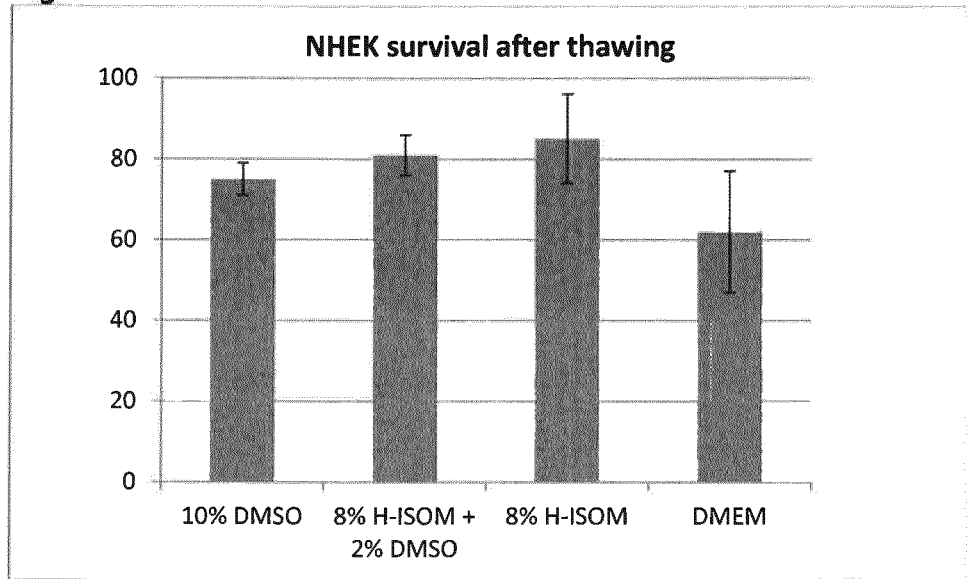

FIG. 4 shows survival of NHEKs after thawing in respectively 1) 10% DMSO, 2) 8% hydrogenated isomaltooligosaccharide 1 (H-ISOM) and 2% DMSO, 3) 8% hydrogenated isomaltooligosaccharide 1 (H-ISOM) and 4) DMEM as described in Example 3.

Figure 5:
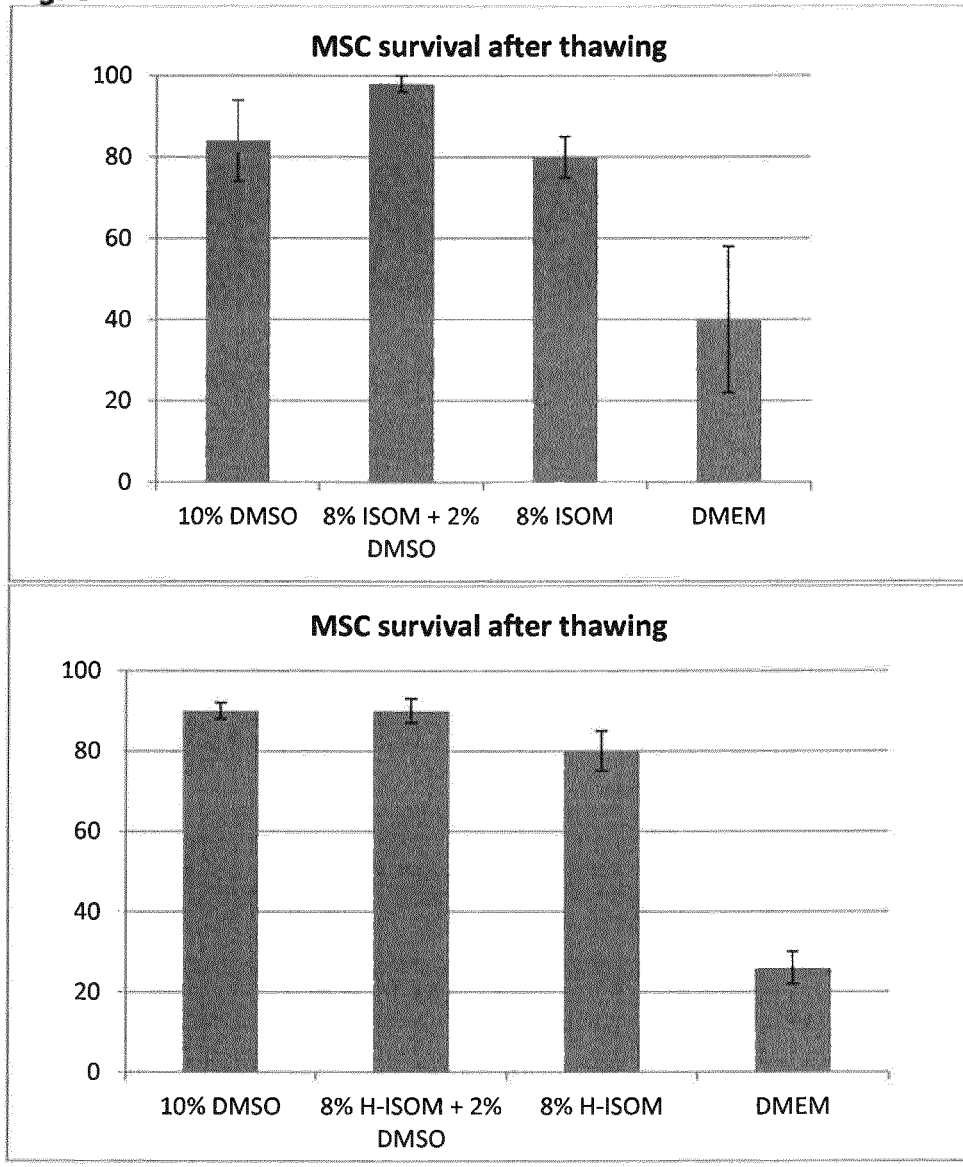

FIG. 5 shows survival of MSCs after thawing and viability after 1. passage in respectively 1) 10% DMSO, 2) 8% isomaltooligosaccharide 1 (ISOM) and 2% DMSO, 3) 8% hydrogenated isomaltooligosaccharide 1 (H-ISOM) and 2% DMSO, 4) 8% isomaltooligosaccharide 1 (ISOM), 5) 8% hydrogenated isomaltooligosaccharide 1 (H-ISOM) and 6) DMEM as described in Example 4.

Figure 6:
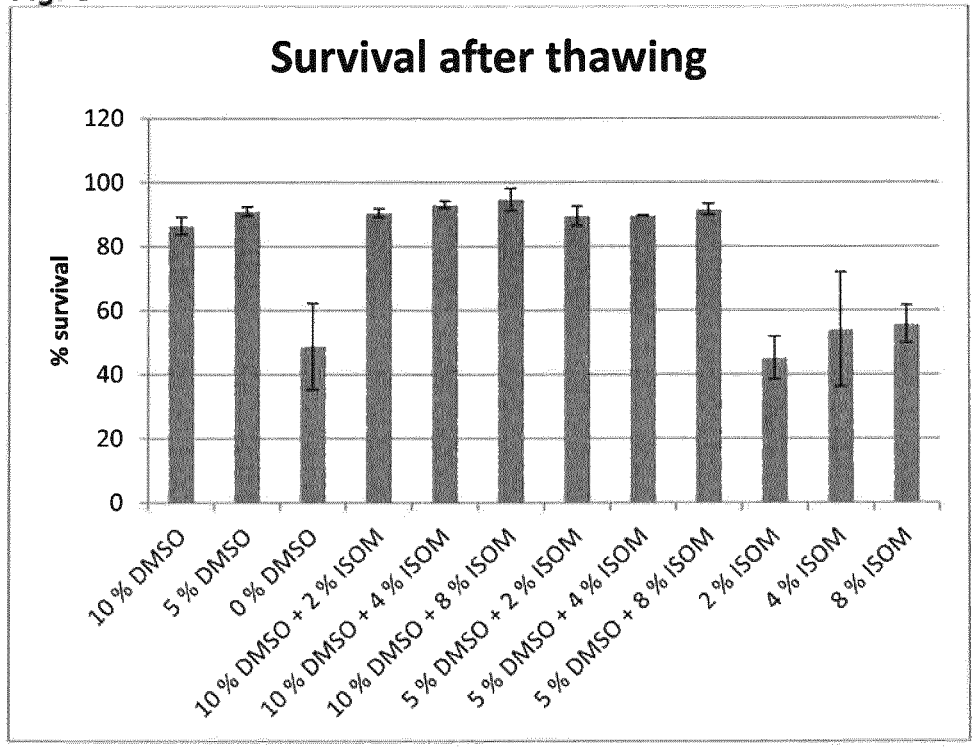

FIG. 6 shows survival of Human iPS cells in PluriPro growth medium after thawing and cryopreservation in respectively Growth medium+10% DMSO, Growth medium+5% DMSO, Growth medium+10% DMSO+2% isomaltooligosaccharide 1 (ISOM), Growth medium+10% DMSO+4% isomaltooligosaccharide 1 (ISOM), Growth medium+10% DMSO+8% isomaltooligosaccharide 1 (ISOM), Growth medium+5% DMSO+2% isomaltooligosaccharide 1 (ISOM), Growth medium+5% DMSO+4% isomaltooligosaccharide 1 (ISOM), Growth medium+5% DMSO+8% isomaltooligosaccharide 1 (ISOM), Growth medium+2% isomaltooligosaccharide 1 (ISOM), Growth medium+4% isomaltooligosaccharide 1 (ISOM), Growth medium+8% isomaltooligosaccharide 1 (ISOM), and Growth medium without any cryoprotectant as described in Example 7.

Figure 7:
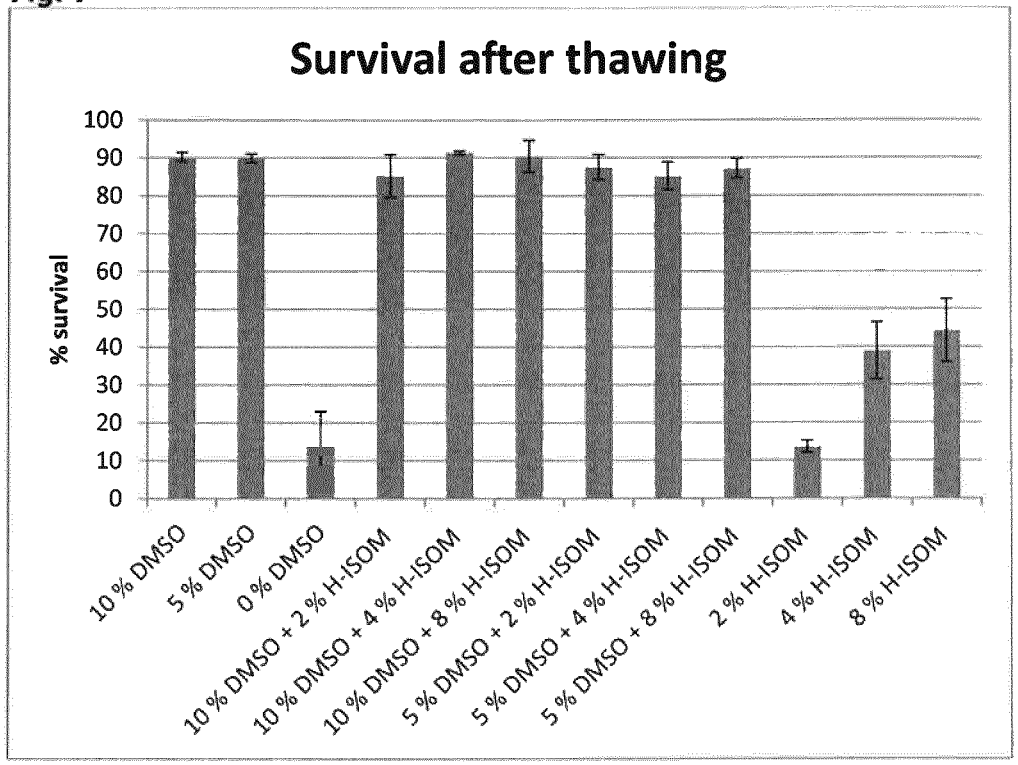

FIG. 7 shows survival of Human iPS cells in PluriPro growth medium after thawing and cryopreservation in respectively Growth medium+10% DMSO, Growth medium+5% DMSO, Growth medium+10% DMSO+2% hydrogenated isomaltooligosaccharide 1 (H-ISOM), Growth medium+10% DMSO+4% hydrogenated isomaltooligosaccharide 1 (H-ISOM), Growth medium+10% DMSO+8% hydrogenated isomaltooligosaccharide 1 (H-ISOM), Growth medium+5% DMSO+2% hydrogenated isomaltooligosaccharide 1 (H-ISOM), Growth medium+5% DMSO+4% hydrogenated isomaltooligosaccharide 1 (H-ISOM), Growth medium+5% DMSO+8% hydrogenated isomaltooligosaccharide 1 (H-ISOM), Growth medium+2% hydrogenated isomaltooligosaccharide 1 (H-ISOM), Growth medium+4% hydrogenated isomaltooligosaccharide 1 (H-ISOM), Growth medium+8% hydrogenated isomaltooligosaccharide 1 (H-ISOM) and Growth medium without any cryoprotectant as described in Example 8.

FIG. 8 shows survival of MSCs after thawing and proliferation after 3 days in respectively 1) 10% DMSO, 2) "CRYO" which designates 8% isomaltooligosaccharide 1, Dextran Mw10.000 or Dextran Mw 40.000 respectively, each combined with 5% DMSO, 3) "CRYO" which designates 8% isomaltooligosaccharide 1, Dextran Mw 10.000 or Dextran Mw 40.000 respectively, each combined with 1% DMSO, 4) "CRYO" which designates 8% isomaltooligosaccharide 1, Dextran Mw 10.000 or Dextran Mw 40.000 respectively and 5) DMEM as further described in Example 9.

Figure 9:
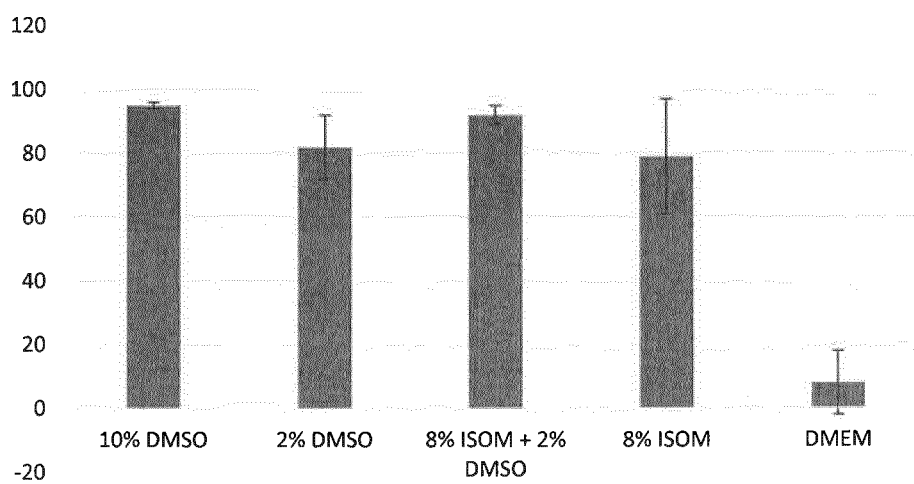

FIG. 9 shows survival of MSCs after thawing in respectively 1) 10% DMSO, 2) 2% DMSO, 3) 8% isomaltooligosaccharide Mw 1500 (ISOM) and 2% DMSO, 4) 8% isomaltooligosaccharide Mw 1500 (ISOM), and 5) DMEM as further described in Example 10.

Figure 10:
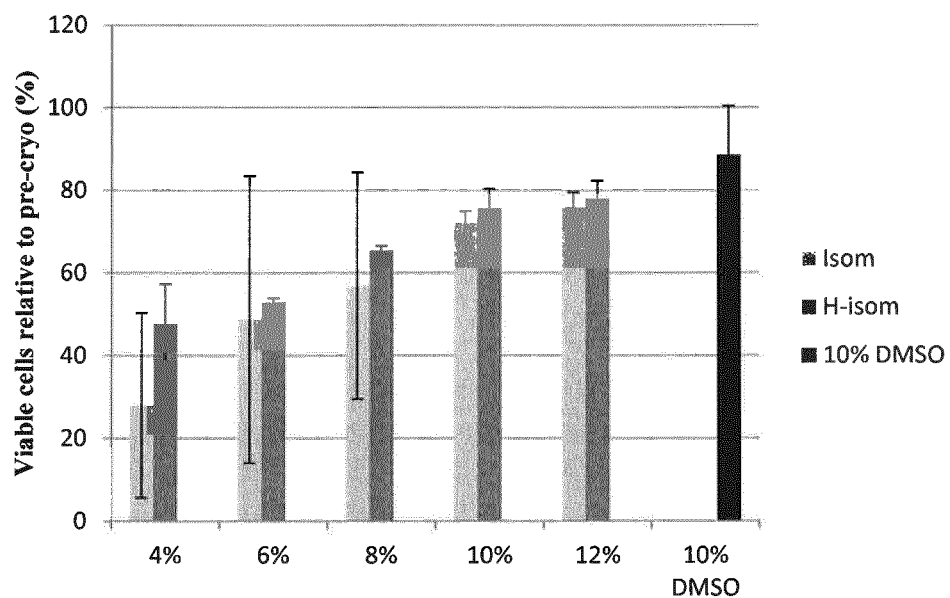

FIG. 10 shows viability of CD34+ hematopoietic stem cell following cryopreservation with DMSO, isomaltooligosaccharide 1 or hydrogenated isomaltooligosaccharide 1 as further described in example 11.

Figure 11:
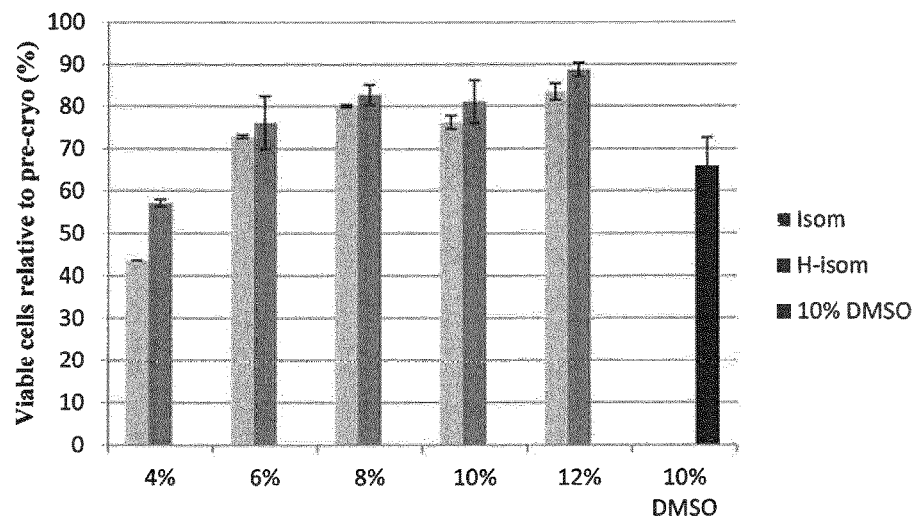

FIG. 11 shows viability of adipose-derived stromal/stem cells (ASC's) following cryopreservation with DMSO, isomaltooligosaccharide 1 or hydrogenated isomaltooligosaccharide 1 as further described in example 12.

DETAILED DISCLOSURE OF THE INVENTION

Definitions

As used herein, cryopreservation means a process where a sample is preserved by cooling to sub-zero temperatures, including vitrification technology in which the cooling rate is faster than a conventional cryopreservation procedure. At such low temperatures activity such as biological activity, including the biochemical reactions that would cause for example cell death, are reduced, and the chemical structure/function of for example proteins/glyco-proteins or lipoproteins are preserved. If cryoprotectant solutions are not used, the samples being preserved are likely to be damaged due to freezing during the cooling or thawing process.

In one preferred aspect, cryopreservation means a process where samples are preserved by cooling to sub-zero temperatures, typically 77 K (=196° C., the boiling point of liquid nitrogen). At these low temperatures, any biological activity, including the biochemical reactions that would cause cell death, is effectively stopped.

As used herein, the term "cryopreservation temperature" designates a temperature of from sub-zero to −196° C., such as from −50° C. to −196° C., such as from −80° C. to −196° C., such as a temperature below −55° C., such as below −60° C., such as below −65° C., such as below −70° C., such as below −75° C., such as below −80° C., such as below −85° C., such as below −90° C., such as below −95° C., such as below −100° C., such as below −105° C., such as below −110° C., such as below −115° C., such as below −120° C., such as below −125° C., such as below −130° C., such as below −135° C., such as below −140° C., such as below −145° C., such as below −150° C., such as below −155° C., such as below −160° C., such as below −165° C., such as below −170° C., such as below −175° C., such as below −180° C., such as below −185° C., such as below −190° C.

As used herein, the term "sample" means any kind of material to be cryopreserved such as organs, cells, or tissue. In one aspect, a sample is selected from the group consisting of organs, cells, tissue and blood. In one aspect, a sample is selected from the group consisting of organs, cells, and tissue, such as selected from the group consisting of mammalian organs, mammalian cells and mammalian tissues. In one aspect, the term "sample" does not comprise the human body at the various stages of its formation and development. In a further aspect, the present invention relates to the use of a cryoprotecting agent as described herein for cryopreserving a sample for transplantation. In one aspect, the sample is selected from the group consisting of mammalian organs, mammalian cells and mammalian tissues for transplantation.

As used herein, the term "cells" comprises any type of cells such as somatic cells including all kind of cells in tissue or organs, stem cells including all types of totipotent stem cells, pluripotent stem cells, multipotent stem cells and progenitor cells; oocytes; spermatozoa; and germ cells. The cells may be in isolated form or in a not isolated form such as in the form of a cell-containing bodily fluid, a tissue or organ.

As used herein, the term "cell-containing bodily fluids" comprises any cell-containing bodily fluid such as for example below defined blood, amniotic fluid, semen, cerebrospinal fluid, bone marrow aspirates and menstrual fluid.

As used herein, the term "blood" comprises any blood containing fluid such as umbilical cord blood, peripheral blood, and mobilized blood.

As used herein, the term "tissue" or "tissues" comprises any tissue type comprising any kind of cell type and combinations thereof, including ovarian tissue, testicular tissue, umbilical cord tissue, placental tissue, connective tissue, cardiac tissue, tissues from muscle, cartilage and bone, endocrine tissue, and neural tissue. The term "tissue" or "tissues" also comprise adipose tissue or dental pulp tissue.

As used herein, the term "organ" comprises for example lung, liver, kidney, heart, ovaries and pancreas. The term "organ" also comprise umbilical cord.

As used herein, the term "functional after cryopreservation" in relation to a sample means that the sample such as organs, tissue or cells after cryopreservation retains an acceptable and/or desired function after cryopreservation. In one aspect, the sample after cryopreservation retains all its function. In another aspect, the sample, such as cells, at least retains 50% of the desired function, such as at least 60% of the desired function, such as at least 70% of the desired function, such as at least 80% of the desired function, such as at least 90% of the desired function, such as at least 95% of the desired function, such as 100% of the desired function, As an example with regards to cells an important function to be preserved is the viability of the cells. As another example with regards to organs an important function to be preserved is the physiological function of such organ, e.g. for a heart the pumping function. As another example with regards to tissue an important function to be preserved is the ability of such tissue to integrate with surrounding tissue (e.g. skin) in the case of transplantation.

The viability of cells after cryopreservation may be measured by using the Nucleocounter system in which dead cells are measured by incubating the cell sample with the DNA binding dye, propidium iodide, which only results in detectable measurement from dead cells as shown in the examples. The viability is given as a percentage of living cells in the population that are being analyzed. The proliferative rate of a cell sample after cryopreservation can be analysed using the colorimetric assay, MTT.

As used herein, the term "banking" means any storage of a sample for future use.

As used herein, the term "clinical banking method" means any storage of a sample relating to clinical treatment of a mammal such as a human being.

As used herein, the term "marrow banking method" means storage of a marrow sample such as bone marrow aspirates and related bodily fluid, or cells isolated from marrow.

As used herein, the term "dental pulp tissue banking method" means storage of a dental pulp tissue sample such as cells isolated from dental pulp tissue.

As used herein, the term "fat tissue banking method" means storage of a fat tissue sample such as cells isolated from fat tissue. In the present context the term and in the following, "umbilical cord banking method" means storage of umbilical cord blood, tissues related to umbilical cord or cells isolated from umbilical cord blood or tissue.

In the present context the term and in the following, "mobilized peripheral blood banking method" means storage of peripheral blood after mobilizing with agents that for example releases blood stem cells into the circulation.

As used herein the term, "reproduction banking method" means storage of any sample relating to reproduction such as semen, oocytes, spermatozoa, fertilized eggs etc.

The atomic mass unit Dalton (symbol: Da) is the standard unit used for indicating mass on an atomic or molecular scale (atomic mass). It is defined as one twelfth of the remaining mass of an unbound neutral atom of carbon-12 in its nuclear and electronic ground state.

As used herein, the term "weight average molecular weight" ($M_w$) is defined as:

$$M_w = \frac{\sum_{i=1}^{i=p} g_i M_i}{\sum_{i=1}^{i=p} g_i}$$

wherein $g_i$ is the fraction of molecules having the molecular weight $M_i$. The possible values of M make up a set of numbers with discrete values labelled $M_i$, defining p.

As used herein, the term "number average molecular weight" is defined as:

$$M_n = \frac{\sum_{i=1}^{i=p} (g_i/M_i) M_i}{\sum_{i=1}^{i=p} (g_i/M_i)} = \frac{\sum_{i=1}^{i=p} N_i M_i}{\sum_{i=1}^{i=p} N_i}$$

wherein $N_i$ is the fraction of molecules having the molecular weight $M_i$, $g_i$ is the fraction of molecules having the molecular weight $M_i$. The possible values of M make up a set of numbers with discrete values labelled $M_i$, defining p.

As used herein, the term polydispersity (Pd) is calculated by $M_w/M_n=Pd$.

As used herein, the term "Dextran" followed by a number such as "Dextran 1", "Dextran 40" and "Dextran 70" follows the Pharmacopoeial abbreviation for Dextran X meaning that the weight average molecular weight of the dextran is approximately X kDA. Thus Dextran 1 means a dextran having a weight average molecular weight of 850-1,150 Da. Isomaltooligosaccharide 1, and hydrogenated isomaltooligosaccharide 1 are named similarly. Isomaltooligosaccharide 1 means thus a mixture of isomaltooligosaccharides having a weight average molecular weight of 850-1,150 Da conforming to the EP and USP Monographs for Dextran 1. Isomaltooligosaccharide 1 is also named pentaisomaltose in this application. Hydrogenated isomaltooligosaccharide 1 means a mixture of hydrogenated isomaltooligosaccharides, where the isomaltooligosaccharides conforms to the EP and USP Monographs for Dextran 1. Hydrogenated isomaltooligosaccharide 1 is also named pentaisomaltoside in this application.

As used herein, the term "dextran-based isomaltooligosaccharide" means an isomaltooligosaccharide having a weight average molecular weight ($M_w$) of between 300 and 1,650 Da, such as between 850 and 1,650 Da and obtained from hydrolysed dextran such as by hydrolysis of low molecular weight dextran.

As used herein, the term "cryoprotectant" means a substance which for example in an appropriate solution is used to protect a sample from freezing damage. Examples of known cryoprotectants are for example DMSO, polyols etc.

As used herein, the term "sterile" means free from living germs, microorganisms and other organisms capable of proliferation.

As used herein, the term "substantially free of DMSO" means DMSO in an amount less than 0.01 w/w %.

As used herein, "$C_{1-10}$alkyl" is a hydrocarbon being a straight-chain or branched $C_{1-10}$alkyl such as a straight-chain or branched $C_{1-6}$alkyl. Examples are methyl, ethyl, 1-propyl, 2-propyl, isopropyl, 1-butyl, 2-methyl-1-propyl, 2-butyl, 1-pentyl, 3-pentyl, 2-methyl-2-butyl, and 3-methyl-2-butyl.

As used herein, "carboxy$C_{1-10}$alkyl" means —$C_{1-10}$alkyl-COOH. An example is carboxymethyl (CM) (—$CH_2COOH$).

As used herein, the term "DEAE" means diethylaminoethyl.

Cryoprotecting Agent

Described herein is a cryoprotecting agent comprising a cryoprotectant being one or more selected from the group consisting of dextrin, dextran, isomaltooligosaccharide, and derivatives thereof, and
 a) wherein said cryoprotecting agent comprises at least 1% w/w of one or more of isomaltooligosaccharide and derivatives thereof having a weight average molecular weight ($M_w$) of between 300 and 1,650 Da such as a weight average molecular weight ($M_w$) of between 850 and 1,650 Da based on the total weight of dextrin, dextran, isomaltooligosaccharide, and derivatives thereof in said cryoprotecting agent, or
 b) wherein said cryoprotectant has a weight average molecular weight ($M_w$) of between 300 and 9,500 Da such as of between 300 and 7,500 Da, or
 c) wherein said cryoprotecting agent comprises at least 1% w/w of one or more of isomaltooligosaccharide and derivatives thereof having a weight average molecular weight ($M_w$) of between 300 and 1,650 Da such as between 850 and 1,650 Da based on the total weight of dextrin, dextran, isomaltooligosaccharide and derivatives thereof in said cryoprotecting agent, and said cryoprotectant has a weight average molecular weight ($M_w$) of between 300 and 9,500 Da.

In one aspect, said cryoprotectant is selected from the group consisting of dextran, isomaltooligosaccharide, and derivatives thereof, The molecular weight of dextran and dextrin, and/or a derivative thereof is typically determined by means of gel permeation chromatography (GPC) using for example GPC columns of the type polyether hydroxylated gels. The calibration may be performed as described in the European Pharmacopoeia 7$^{th}$ Edition for dextran and using the iterative mathematical method as described in the European Pharmacopoeia 7$^{th}$ Edition, volume 2, pages 1816-1817, for dextran.

The molecular weight of isomaltooligosaccharide and/or a derivative thereof such as hydrogenated isomaltooligosaccharide, is typically determined by means of gel permeation chromatography (GPC). The stationary phase in the column system may be dextran covalently bound to highly cross-linked porous agarose beads, allowing resolution of oligosaccharides in the molecular mass range 180-3000 Da. The measurement is made in accordance with the European Pharmacopoeia 7$^{th}$ Edition, volume 1, page 60-61.

When said cryoprotectant is electrical neutral the weight average molecular weight ($M_w$) of said cryoprotectant is preferably measured by GPC. When measuring weight average molecular weight ($M_w$) of a cryoprotectant carrying an electrical charge, the weight average molecular weight ($M_w$) is calculated based on the molecular weight of the electrical neutral starting material, and the substitution degree of the charged cryoprotectant. Each glucose unit in the uncharged starting material can be substituted with between 1 and 3 substituents. Using DEAE as an example of a substituent the skilled person may for example measure the nitrogen content (e.g. using Kjeldahl analysis) to calculate the degree of substitution an thereafter calculate the molecular weight of the final product. If the substituent contains an acid group the degree of substitution may for example be determined by the skilled person by titration, and thereafter the final molecular weight may be calculated.

Dextrin, dextran, and isomaltooligosaccharide all comprise repeating D-glucose units. Dextrans are a family of neutral branched polysaccharides consisting predominantly of an α-(1→6) linked D-glucose as further described in the following. Dextrins are mixtures of polymers of D-glucose units linked by α-(1→4) or α-(1→6) glycosidic bonds as further described in the following. Isomaltooligosaccharide is a mixture of glucose oligomers with α-D-(1,6)-linkages (typically fewer than 10 D-glucose units, suitably between 3-6 glucose units) and typically has an average weight molecular weight between 300 and 1,650 Da, such as between 500 and 1,650 Da, such as between 850 and 1,650 Da, or such as between 850 Da and 1150 Da. In one aspect, the weight fraction of isomaltooligosaccharides having less than 3 glucose units is less than 15% w/w. In one aspect, the weight fraction of isomaltooligosaccharides having more than 9 glucose units is less than 20% w/w such as less than 15% w/w, such as less than 10% w/w. In a further aspect, the weight fraction of isomaltooligosaccharides having less than 3 glucose units is less than 15% w/w and the weight fraction of isomaltooligosaccharides having more than 9 glucose units is less than 20% w/w such as less than 15% w/w, such as less than 10% w/w. The weight fraction may for example be determined as described in Preparation example 1 and 2 herein.

In one aspect, a derivative of dextrin, dextran, and isomaltooligosaccharide are selected from the group consisting of hydrogenated isomaltooligosaccharide, hydrogenated dextran, hydrogenated dextrin, oxidised isomaltooligosaccharide, oxidised dextran, oxidised dextrin, ester of dextrin, ester of dextran, ester of isomaltooligosaccharide, ether of dextrin, ether of dextran, ether of isomaltooligosaccharide, and partly hydrogenated/oxidised dextrin, partly hydrogenated/oxidised dextran and partly hydrogenated/oxidised isomaltooligosaccharide, and derivatives thereof. In one aspect, a derivative of isomaltooligosaccharide is selected from the group consisting of hydrogenated isomaltooligosaccharide, oxidised isomaltooligosaccharide, ester of isomaltooligosaccharide, ether of isomaltooligosaccharide, and partly hydrogenated/oxidised isomaltooligosaccharide, and derivatives thereof.

Below is a schematic overview (Table A) of examples of the different syntheses and starting materials for the above described derivatives of dextrin, dextran, and isomaltooligosaccharide:

TABLE A

| Starting material/ Synthesis | Hydro-genation | Oxidation* | Esteri-fication | Etheri-fication |
|---|---|---|---|---|
| Dextran | x | x | x | x |
| Isomaltooligo-saccharides | x | x | x | x |
| Dextrin | x | x | x | x |
| Hydrogenated dextran |  | x | x | x |
| Hydrogenated isomaltooligo-saccharides |  | x | x | x |
| Hydrogenated Dextrin |  | x | x | x |
| Oxidated dextran | x |  | x | x |
| Oxidated isomaltooligo-saccharides | x |  | x | x |
| Oxidated dextrin | x |  | x | x |

*in one aspect, the synthesis may be a partly oxidation and hydrogenation method to obtain partly oxidisided and hydrogenated derivatives for example as described in U.S. Pat. No. 6,977,249

In one aspect, the type of said ether of dextrin, ether of dextran and ether of isomaltooligosaccharide is selected from the group consisting of ethers having a functional group R. R is selected from the group consisting of $C_{1-10}$alkyl such as $C_{1-6}$alkyl such as methyl (—$CH_3$) and ethyl (—$C_2H_5$), carboxy$C_{1-10}$alkyl such as carboxymethyl (—$CH_2COOH$), hydroxy $C_{1-10}$alkyl such as 2-hydroxyethyl (—$C_2H_4OH$), 2-hydroxypropyl (—$CH_2CHOHCH_3$), 2-hydroxyalkyl (—$CH_2CHOH(CH2)_nCH_3$ wherein n is 1-10), 3-chloro-2-hydroxypropyl (—$CH_2CHOHCH_2Cl$), 2-diethylaminoethyl (—$C_2H_4N(C_2H_5)_2$), 3-amino-2-hydroxypropyl (—$CH_2CHOHCH_2NH_2$), 3-dimethylalkylammonium-2-hydroxypropyl (—$CH_2CHOHCH_2N^+(CH_3)_2R$ wherein R is $C_{1-10}$alkyl), polyethyleneglycol cetyl (—$CH_2CH_2O)_{10}C_{16}H_{33}$), and polyethyleneglycol stearyl (—$CH_2CH_2O)_{10}C_{18}H_{37}$).

In one aspect, said ether of dextrin, ether of dextran and ether of isomaltooligosaccharide is respectively DEAE-dextrin, DEAE-dextran, DEAE-isomaltooligosaccharides. In one aspect, said ether of isomaltooligosaccharide is DEAE-isomaltooligosaccharide. In one aspect, said ether of dextrin, ether of dextran and ether of isomaltooligosaccharide is respectively carboxy$C_{1-10}$alkyl-dextrin, carboxy$C_{1-10}$alkyl-dextran, carboxy$C_{1-10}$alkyl-isomaltooligosaccharide. In one aspect, said ether of isomaltooligosaccharide is carboxy$C_{1-10}$alkyl-isomaltooligosaccharide, In one aspect, a derivative of dextrin, dextran, and isomaltooligosaccharide are selected from the group consisting of hydrogenated isomaltooligosaccharide, hydrogenated dextran and hydrogenated dextrin. In one aspect, a derivative of isomaltooligosaccharide is hydrogenated isomaltooligosaccharide.

In another aspect, a derivative of dextrin, dextran, and isomaltooligosaccharide are selected from the group consisting of oxidised isomaltooligosaccharide, oxidised dextran and oxidised dextrin. In one aspect, a derivative of isomaltooligosaccharide is oxidised isomaltooligosaccharide. In another aspect, a derivative of dextrin, dextran, and isomaltooligosaccharide are selected from the group consisting of oxidised/hydrogenated isomaltooligosaccharide, oxidised/hydrogenated dextran and oxidised/hydrogenated dextrin. In one aspect, a derivative of isomaltooligosaccharide is oxidised/hydrogenated isomaltooligosaccharide.

In another aspect, a derivative of dextrin, dextran and isomaltooligosaccharide are selected from the group consisting of DEAE-dextrin, DEAE-dextran, DEAE-isomaltooligosaccharide, carboxyC1-10alkyl-dextrin, carboxyC1-10alkyl-dextran, carboxyC1-10alkyl-isomaltooligosaccharide, ester of dextrin, ester of dextran and ester of isomaltooligosaccharide. In another aspect, a derivative of isomaltooligosaccharide is selected from the group consisting of DEAE-isomaltooligosaccharide, carboxyC1-10alkyl-isomaltooligosaccharide, and ester of isomaltooligosaccharide.

In another aspect, a derivative of dextrin, dextran, and isomaltooligosaccharide are selected from the group consisting of derivatives of hydrogenated dextrin, hydrogenated dextran, hydrogenated isomaltooligosaccharides such as selected from the group consisting of DEAE-hydrogenated dextrin, DEAE-hydrogenated dextran, DEAE-hydrogenated isomaltooligosaccharides, carboxy$C_{1-10}$alkyl-hydrogenated dextrin, carboxy$C_{1-10}$alkyl-hydrogenated dextran, carboxy$C_{1-10}$alkyl-hydrogenated isomaltooligosaccharide, ester of hydrogenated dextrin, ester of hydrogenated dextran and ester of hydrogenated isomaltooligosaccharide. In another aspect, a derivative of isomaltooligosaccharide is selected from the group consisting of derivatives of hydrogenated isomaltooligosaccharides such as selected from the group consisting of DEAE-hydrogenated isomaltooligosaccharides, carboxy$C_{1-10}$alkyl-hydrogenated isomaltooligosaccharide, and ester of hydrogenated isomaltooligosaccharide. In another aspect, a derivative of dextrin, dextran, and isomaltooligosaccharide are selected from the group consisting of derivatives of oxidised dextrin, oxidised dextran and oxidised isomaltooligosaccharides such as selected from the group consisting of DEAE-oxidised dextrin, DEAE-oxidised dextran, DEAE-oxidised isomaltooligosaccharides, carboxy$C_{1-10}$alkyl-oxidised dextrin, carboxy$C_{1-10}$alkyl-oxidised dextran, carboxy$C_{1-10}$alkyl-oxidised isomaltooligosaccharide, ester of oxidised dextrin, ester of oxidised dextran and ester of oxidised isomaltooligosaccharide. In another aspect, a derivative of isomaltooligosaccharide is selected from the group consisting of derivatives of oxidised isomaltooligosaccharides such as selected from the group consisting of DEAE-oxidised isomaltooligosaccharides, carboxy$C_{1-10}$alkyl-oxidised isomaltooligosaccharide, and ester of oxidised isomaltooligosaccharide.

In yet a further aspect, the cryoprotectant is a hydrogenated isomaltooligosaccharide, an oxidised isomaltooligosaccharide, DEAE-isomaltooligosaccharid, a carboxy$C_{1-10}$alkyl oxidised isomaltooligosaccharide, an ester of isomaltooligosaccharide, an ether of isomaltooligosaccharide or a carboxy$C_{1-10}$alkyl isomaltooligosaccharide.

In yet a further aspect, the cryoprotectant is carboxymethyl isomaltooligosaccharide or carboxyethyl isomaltooligosaccharide.

In one aspect, the cryoprotectant is isomaltooligosaccharide such as isomaltooligosaccharide 1. In another aspect, the cryoprotectant is hydrogenated isomaltooligosaccharide such as hydrogenated isomaltooligosaccharide 1.

By variation of the derivatisation, various degrees of substitution can be achieved. Suitably, the degree of substitution lays in the range one to three substituents to each glucose unit. In the case of for example DEAE-dextran, preferable approximately one charge group to three glucose units.

In one aspect, the cryoprotecting agent comprises a cryoprotectant being one or more of: dextrin, dextran, isomaltooligosaccharide, and derivatives thereof, and wherein said cryoprotecting agent comprises at least 1% w/w of one or more of isomaltooligosaccharide and derivatives thereof having a weight average molecular weight ($M_w$) of between 300 and 1,650 Da such as having a weight average molecular weight ($M_w$) of between 850 and 1,650 Da based on the total weight of dextrin, dextran, isomaltooligosaccharide, and derivatives thereof in said agent.

In a further aspect, the cryoprotecting agent comprises a cryoprotectant being one or more of: dextrin, dextran, isomaltooligosaccharide, and derivatives thereof, wherein said cryoprotectant has a weight average molecular weight ($M_w$) of between 300 and 9,500 Da, such as between 300 and 7,500 Da, such as between 500 and 7,500 Da. In one aspect, said cryoprotectant has a weight average molecular weight ($M_w$) of at most 9500 Da, such as at most 9000 Da, such as at most 8000 Da, such as at most 7000 Da, such as at most 6000 Da, such as at most 5000 Da, such as at most 4000 Da, such as at most 3000 Da, such as at most 2000 Da, such as at most 1900 Da, such as at most 1800 Da, such as at most 1700 or such as at most 1,650 Da.

In yet a further aspect, the cryoprotecting agent comprises a cryoprotectant being one or more of: dextrin, dextran, isomaltooligosaccharide, and derivatives thereof, and wherein said cryoprotecting agent comprises at least 1% w/w of one or more of isomaltooligosaccharide and derivatives thereof having a weight average molecular weight ($M_w$) of between 300 and 1,650 Da such as having a weight average molecular weight ($M_w$) of between 850 and 1,650 Da based on the total weight of dextrin, dextran, isomaltooligosaccharide, and derivatives thereof in said agent, and wherein said cryoprotectant has a weight average molecular weight ($M_w$) of between 300 and 9,500 Da, such as between 300 and 7,500 Da, such as between 500 and 7,500 Da.

In one aspect, electrically charged derivatives are characterized by the molecular weight distribution of the uncharged starting materials such as the derivatives made from the above mentioned dextrans, dextrins, and isomaltooligosaccharide. Thus in one aspect, said derivatives of dextrans, dextrins and/or isomaltooligosaccharide have a weight average molecular weight ($M_w$) of between 300 and 9,500 Da, such as between 300 and 7,500 Da, such as between 500 and 7,500 Da. In a further aspect, said derivatives are derivatives of isomaltooligosaccharide having a weight average molecular weight ($M_w$) of between 850 and 1,650 Da.

In one aspect, the cryoprotectant selected from the group consisting of dextran, dextrin, and derivatives thereof has a weight average molecular weight ($M_w$) of between 300 and 9,500 Da, such as between 300 and 7,500 Da, such as between 500 and 7,500 Da.

In one aspect, the cryoprotectant selected from the group consisting of dextran, dextrin, and derivatives thereof has a weight average molecular weight ($M_w$) of between 1,650 and 7,500 Da.

In one aspect, the cryoprotectant selected from the group consisting of dextran, dextrin, and derivatives thereof has a weight average molecular weight of between 1,650 and 7,500 Da, and a polydispersity of 1 and 5.

In one aspect, the cryoprotectant selected from the group consisting of dextran, dextrin and derivatives thereof has a weight average molecular weight ($M_w$) of between 1,650 and 3,500 Da.

In one aspect, the cryoprotectant selected from the group consisting of dextran, dextrin and derivatives thereof has a weight average molecular weight of between 1,650 and 3,500 Da, and a polydispersity of ≥1 and ≤5.

In one aspect, the cryoprotectant selected from the group consisting of isomaltooligosaccharide, and derivatives thereof has a weight average molecular weight of between 850 and 1,650 Da.

In one aspect, the cryoprotectant selected from the group consisting of isomaltooligosaccharide and derivatives thereof has a polydispersity of ≥1 and ≤3.

In a further aspect, the cryoprotectant selected from the group consisting of isomaltooligosaccharide, and derivatives thereof has a weight average molecular weight ($M_w$) of between 850 and 1,150 Da.

In a further aspect, the weight fraction of isomaltooligosaccharides having less than 3 glucose units is less than 15% w/w. In one aspect, the weight fraction of isomaltooligosaccharides having more than 9 glucose units is less than 20% w/w such as less than 15% w/w, such as less than 10% w/w. In a further aspect, the weight fraction of isomaltooligosaccharides having less than 3 glucose units is less than 15% w/w and the weight fraction of isomaltooligosaccharides having more than 9 glucose units is less than 20% w/w such as less than 15% w/w, such as less than 10% w/w. The weight fraction may for example be determined as described in Preparation example 1 and 2 herein.

In one aspect, the cryoprotecting agent comprises at least 10% such as 20% w/w of one or more of isomaltooligosaccharide and derivatives thereof having a weight average molecular weight ($M_w$) of between 300 and 1,650 Da such as having a weight average molecular weight ($M_w$) of between 850 and 1,650 Da based on the total weight of dextrin, dextran, isomaltooligosaccharide and derivatives thereof in said agent. In a further aspect, the cryoprotecting agent comprises at least 30%, such as 40%, such as 50%, such as 60%, such as 70%, such as 80%, such as 90%, such as 95% or more w/w of one or more of isomaltooligosaccharide and derivatives thereof having a weight average molecular weight ($M_w$) of between 300 and 1,650 Da such as having a weight average molecular weight ($M_w$) of between 850 and 1,650 Da based on the total weight of dextrin, dextran, isomaltooligosaccharide and derivatives thereof in said agent.

Dextran and Derivatives Thereof

Dextran can be formed by several bacterial strains, mostly gram-positive, facultative anaerobe cocci, e.g. *Leuconostoc* and *Streptococcus* strains as for example described in "Advances in polymer science", Volume 205, Polysaccharides II, editor D. Klemm, Springer Verlag. Dextrans for pharmaceutical use have typically been manufactured by specific bacterial strains defined in the US or European Pharmacopoeias such as for example by *Leuconostoc Mesenteroides* NCTC 10817 or B512 F. The strain NCTC 10817 and B512F is publicly available since 1971 from National Collection Type Cultures (Central Public Health Laboratory) UK, Dextrans are a family of neutral branched polysaccharides consisting predominantly of an α-(1→6) linked D-glucose having a main chain with varying proportions of linkages and branches depending on the bacteria used in the fermentation. The dextran molecule contains one free terminal aldehyde group which is not shown in Formula I. The α-(1→6) linkages in dextran may vary from 50 to 97% of the total glucosidic bonds. The remaining glucosidic bonds represent α-(1→2), α-(1→3) and α-(1→4) linkages bound as branches. Formula I illustrates part of the α-(1→6)-linked glucose main chain of dextran with branching points in 2-, 3- and 4-positions. Using the abovementioned strain B512F the ratio of α-(1-6) linkages ist typically 95% or above.

Formula I

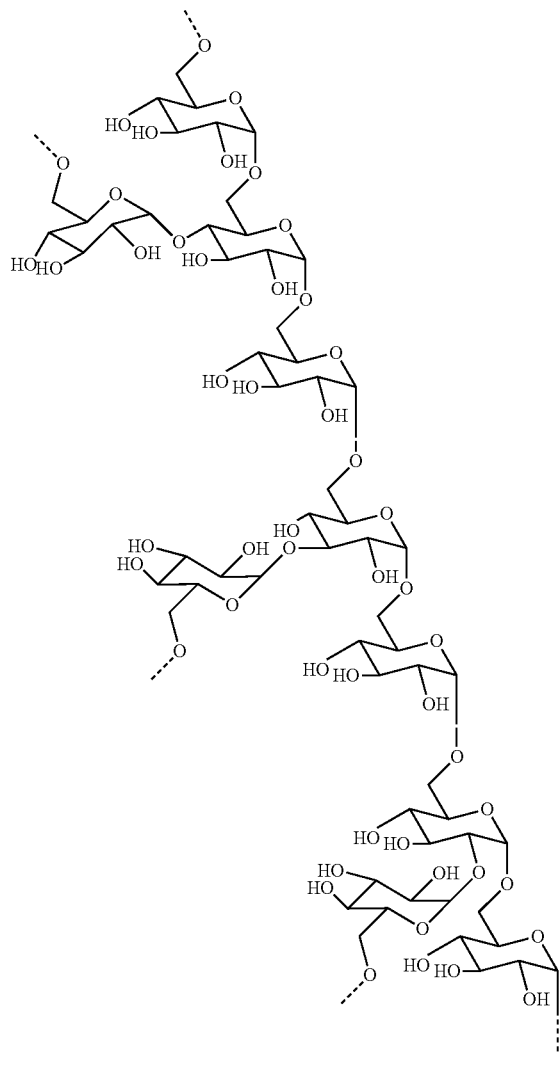

Extremely high values of molecular weight are found for the native dextrans. Values ranging from $10^7$ to $4\times10^8$ Daltons have been reported. In order to make the dextrans usable for many applications it is therefore necessary to hydrolyse the native dextrans to a lower molecular weight. There are several methods known and available to the skilled person, however, the hydrolysis may be performed at approx. pH 1.5, normally using hydrochloric acid, and at a temperature of approx. 95° C. By the hydrolysis low molecular weight dextrans and glucose are produced. The hydrolysate is typically purified and fractionated by various methods such as sedimentations with alcohol, filtrations and other various chromatographic methods including membrane filtration.

Dextrans for pharmaceutical use have typically been manufactured by specific bacterial strains defined in the US or European Pharmacopoeias such as for example by *Leuconostoc Mesenteroides* NCTC 10817 or B512 F. The strain B512F and NCTC 10817 is as mentioned above both publicly available from National Collection Type Cultures (Central Public Health Laboratory) UK.

Among dextrans, particularly Dextran 40 and Dextran 70 have been used for human pharmaceutical use. Other molecular sizes such as e.g. Dextran 500 and Dextran 5 and molecular weights in between are used outside the area of cryopreservation as carriers for synthesis, for separation of cells, as excipients in vaccines or in various other applications such as preservation of the human cornea. Furthermore, Dextran 1 has a special use in humans as pre-injection of Dextran 1 exhibits hapten-inhibition and blocks human dextran antibodies, thus preventing potential allergic reactions known to occur occasionally after administration of high molecular weight dextran in humans. Dextran 1, Dextran 40 and Dextran 70 are well described Pharmacopoeia products (European Pharmacopoeia 7th Edition, volume 2, page 1816-1819).

Dextran is also an excellent raw material used for synthesizing water-soluble polymers.

The following are examples of derivatives of dextran:

1) Hydrogenated dextran which may be synthesised by reaction of dextran with a reducing agent such as borohydride under alkaline conditions for example at pH 8-12 reducing aldehyde end groups into sorbitol.

2) Ethers of dextran which may be synthesies by methods known to the skilled person. As an example mention can be made of 2-(Diethylamino)ethyl dextran (DEAE dextran) (shown in Reaction scheme 1) which may be synthesised by reaction of dextran with (2-chloroethyl)diethylammonium chloride in alkaline solution.

Reaction scheme 1: DEAE dextran containing 2-(diethylamino)ethyl (A) and 2-[(2-(diethylamino)ethyl]diethylammonium]ethyl (B) groups

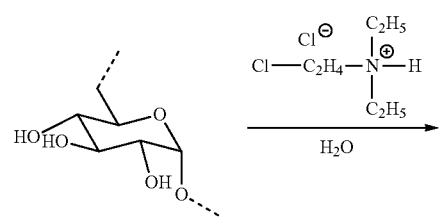

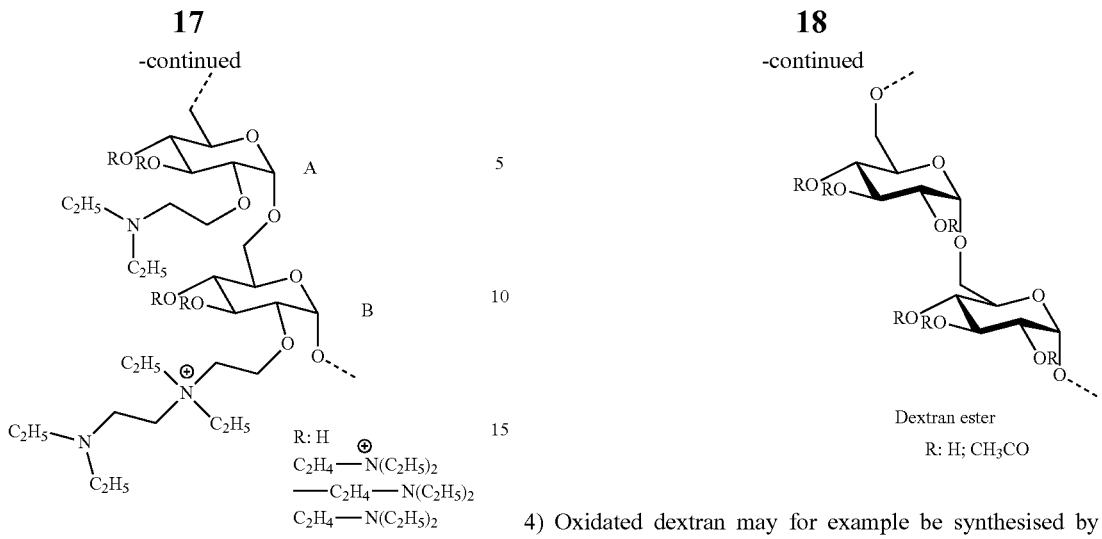

Another example is CarboxyC$_{1-10}$ alkyl dextran such as carboxymethyldextran (CMD) as shown in Reaction Scheme 2 which may be synthesised by reaction with monochloric acetic acid (MCA) under strong alkaline conditions.

Reaction scheme 2

3) Esters of dextran such as dextran acetate which may be synthesised by reaction of dextran with acetic acid anhydride.

Reaction scheme 3

4) Oxidated dextran may for example be synthesised by means of a sodium hypochlorite in a basic aqueous solution.

5) Partly oxidated/hydrogenated dextran. A method of preparation of this type of derivatives is for example disclosed in U.S. Pat. No. 6,977,249 which are incorporated herein by reference. As an example mention can be made of a dextran which is prepared by a process in which process the molecular weight of a dextran is reduced by hydrolysis, and functional aldehyde terminal groups thereof converted into alcohol groups by hydrogenation; characterized in that the hydrogenation is only partial, leaving at the most 15% by weight reducing sugar, calculated on the total amount of carbon hydrates, and said dextran is subsequently subjected to oxidation, said hydrogenation and oxidation being performed to obtain dextran having substantially all aldehyde groups converted into alcohol and carboxylic groups, and said dextran product having no functional aldehyde groups or functional carboxylic acid groups in the intermediate glycosyl groups; wherein the hydrogenation is performed by means of sodium borohydride in aqueous solution; and wherein the oxidation is performed by means of a sodium hypochlorite in basic aqueous solution.

6) Further DEAE-substituted, CarboxyC$_{1-10}$ alkyl-substituted, esters and ethers of above hydrogenated and/or oxidated dextran may be prepared by methods known to the skilled person similar to the above described.

Isomaltooligosaccharide and Derivatives Thereof

Isomaltooligosaccharides are glucose oligomers with an α-D-(1,6)-bound main chain. In one aspect, the isomaltooligosaccharide described herein is dextran-based and is made by hydrolysis of low molecular weight dextran. In a further aspect, the isomaltooligosaccharide described has a weight average molecular weight (M$_w$) of between 300 and 1,650 Da such as having a weight average molecular weight (M$_w$) of between 850 and 1,650 Da. In one aspect, the isomaltooligosaccharide described herein is hydrolysed dextran having a weight average molecular weight (M$_w$) of between 850 and 1,650 Da.

Starting from isomaltooligosaccharide derivatives thereof characterised by the changing of the reducing aldehyde end groups into glycitol/sorbitol may be prepared. The conversion from isomaltooligosaccharide to hydrogenated isomaltooligosaccharide may be performed by treating the isomaltooligosaccharide with a reducing agent, such as e.g. borohydride under alkaline conditions as shown in below Reaction scheme 4:

Reaction scheme 4

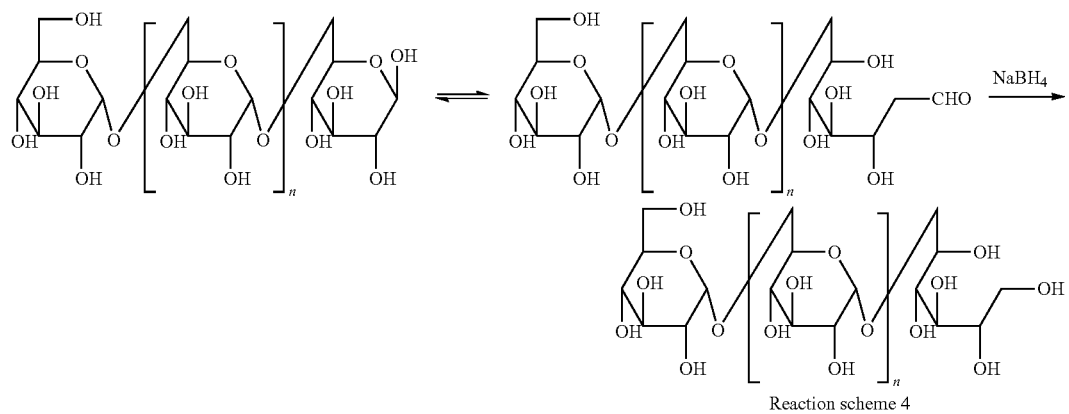

Reaction scheme 4

With the processes described above for making derivatives of dextran, derivatives of isomaltooligosaccharide may also be made for example by the reaction with (2-chloroethyl)diethylammonium chloride making 2-(diethylaminodextran)ethyl (DEAE) isomaltooligosaccharide. Another option is to make isomaltooligosaccharide derivatives by reaction with monochloroacetic acid (MCA) for synthesising carboxymethyl isomaltooligosaccharide. To the skilled person it will be obvious to make further derivatives of hydrogenated isomaltooligosaccharide by reaction with respectively (2-chloroethyl)diethylammonium chloride and monochloroacetic acid as described above under dextran and isomaltooligosaccharide.

Oligo-Isomaltose

With dextrans as starting materials and Dextran 1 (isomaltooligosaccharide) as intermediary, it is possible to synthesise oligo-isomaltose, characterized by a complete lack of branching side-chains α-(1→2), α-(1→3) and α-(1→4) defining the dextran molecules. In the present context oligoisomaltose is considered as a subset of isomaltooligosaccharide. Thus, in one aspect, oligoisomaltose has a weight average molecular weight (Mw) of between 300 and 1,650 Da such as between 850 and 1,650 Da, preferably between 850 and 1,150 Da, and having a complete lack of branching side-chains α-(1→2), α-(1→3) and α-(1→4). Obviously the same synthesis of derivatives described above for isomaltooligosaccharide can be performed using oligo-isomaltose.

Dextrin and Derivatives Thereof

Dextrins are a group of low-molecular-weight carbohydrates produced by the hydrolysis of starch. Dextrins are as dextrans polymers consisting of a mixture of molecules with varying length of the backbone glucose chain. Before using the dextrins they are typically purified and fractionated e.g. by applying hydrolysis or one or more alcohol sedimentation processes and/or by various chromatographic methods including membrane processing applying one or more membranes with specific cut-off values in order to obtain the desired molecular seize and weight distribution.

Dextrins are mixtures of polymers of D-glucose units linked by α-(1→4) or α-(1→6) glycosidic bonds as shown in Formula II.

Formula II

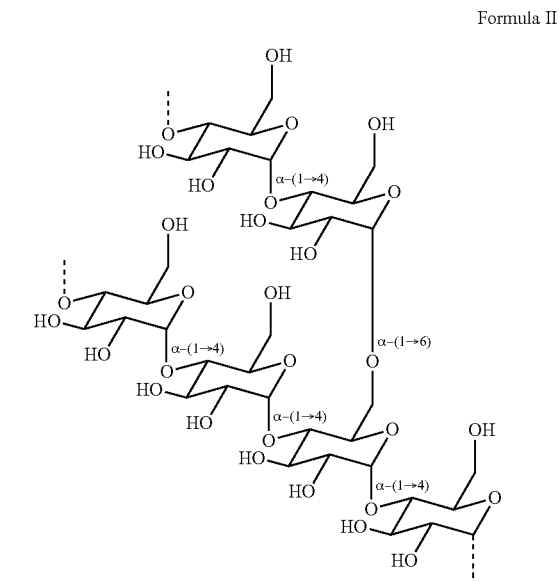

Derivatives of dextrin may be made by methods known to the skilled person similar to the above described under dextran and isomaltooligosaccharide.

Cryopreservation

In order to avoid contamination of the sample to be cryopreserved it is preferred that the cryoprotectant is sterile, and that other optional components of the cryopreservation agent/composition also are sterile.

In some applications it might be useful to supplement a cryoprotectant selected from the group consisting of dextrin, dextran, isomaltooligosaccharide, and derivatives thereof with an additional cryoprotectant in order to reduce the concentration of such additional cryoprotectant, preferably to non-toxic concentrations. This may be particular useful for specific cell types, like hepatocytes or pluripotent stem cells. In a further aspect, the cryoprotecting agent thus further comprises at least one additional cryoprotectant selected from the group consisting of acetamide, agarose, alginate, 1-analine, albumin, ammonium acetate, butanediol, chondroitin sulfate, chloroform, choline, diethylene glycol, dimethyl acetamide, dimethyl formamide, dimethyl sulfoxide (DMSO), erythritol, ethanol, ethylene glycol, formamide, glucose, glycerol, a-glycerophosphate, glycerol monoacetate, glycine, hydroxyethyl starch, inositol, lactose, magnesium chloride, magnesium sulfate, maltose, mannitol, mannose, methanol, methyl acetamide, methylformamide, methyl ureas, phenol, pluronic polyols, polyethylene glycol, polyvinylpyrrolidone, proline, propylene glycol, pyridine N-oxide, ribose, serine, sodium bromide, sodium chloride, sodium iodide, sodium nitrate, sodium sulfate, sorbitol, sucrose, trehalose, triethylene glycol, trimethylamine acetate, urea, valine and xylose. In one aspect, said additional cryoprotectant is DMSO. An advantage of adding DMSO in a reduced amount may be that for very fragile cells an additional protection may be obtained. In a preferred aspect, the cryoprotecting agent is free of or substantially free of DMSO. Thus, in yet a preferred aspect, said dextrin, dextran, isomaltooligosaccharide, or a derivative thereof is the only cryoprotectant in the cryoprotecting agent. A cryoprotecting agent free or substantially free of DMSO may not require washing after thawing of the sample. The thawed sample may then be directly suspended in a culture medium to immediately start a culturing process without having to wash the sample or may be directly used in a patient without a washing step that potentially leads to substantial cell loss. Another advantage using a cryoprotecting agent free of or substantially free of DMSO is that the sample may be exposed to the cryoprotectant for a longer period without damage, enabling a more efficient working process.

In another aspect, the cryoprotecting agent further comprises at least one anti-freeze protein and/or anti-freeze glycoprotein such as in an amount of from 0.01 to 1 mg/mL of the cryoprotecting agent. An example of an anti-freeze glycoprotein is Type I AFP from longhorn sculpin, which is a single, long amphipathic alpha helix.

The cryoprotecting agent or composition may comprise further substances for improving the viability of the sample. As examples of such substances mention can be made of IAPs (inhibitors of apoptosis), inhibitors of the rho-associated protein kinase (ROCK) signaling pathways, growth factors such as EGF, FGF, PDGF, IGF, EPO, BDNF, TGF, TNF, VEGF. In a further aspect, mention can be made of any serum components of human, bovine, equine, canine origin. The cryoprotecting agent or composition may also comprise a growth medium. In one aspect, a growth medium comprising β-catenin/P300 antagonist and an Activin/TGFβ ligand, such as for example ID-8 in conjunction with Activin and TGFβ, may be used. This type of medium is especially useful for culturing of pluripotent stem cells, in particular embryonic stem cells as for example described in WO 2013/054112. Another example is the standard knock-out medium comprising KnockOut Serum Replacement, DMEM/F12 with GlutaMAX™ supplement, FGF, NEAA and BME. Another example is the mTSER™ system. Other examples of growth media depending on the sample to be cryopreserved is well known to the skilled person.

The cryoprotecting agent as disclosed herein may be in the form of a powder such as a lyophilized or spray dried powder.

In a further aspect, said cryoprotecting agent is in the form of a solution. The agent may thus further comprise a solvent such as for example sterile water. In one aspect, said agent comprises from 30% to 70% w/w of said cryoprotectant, such as from 40% to 65% w/w or from 50% to 60% w/w of said cryoprotectant.

The sample such as cells, tissue or organs to be cryopreserved can also be in contact with a freezing compatible pH buffer comprised most typically of at least a basic salt solution, an energy source (for example, glucose) and a buffer capable of maintaining a neutral pH at low temperatures. Well known materials include, for example, Dulbecco's Modified Eagle Medium (DMEM). This material may also be included as part of the cryopreservation composition and/or agent.

One aspect disclosed herein is a cryopreservation composition comprising a cryoprotecting agent as described herein, which cryopreservation composition further comprises a sample to be cryopreserved.

A further aspect disclosed herein is a cryopreserved composition comprising a cryoprotecting agent and a sample which has been cryopreserved or is in the process of being cryopreserved. As described herein the term, "a cryopreserved composition" means either "a cryopreservation composition" which is in the process of being cryopreserved or already has been cryopreserved.

A further aspect disclosed herein is a cryopreserved composition comprising a growth medium or substrate for the sample to be cryopreserved.

In one aspect, the sample is selected from the group consisting of organs, cells, and tissues such as mammalian. In a further aspect, the sample is organs, cells, blood or tissues. Examples of such cells to be cryopreserved are in-vitro-cultured cells including primary cells, cell lines, in vitro-sorted cells including human blood cells, and fertilized eggs of animal and human origin. Further examples are sperm cells, embryonic stem cells, IPS cells, mesenchymal stem cells, haemopoietic stem cells, neuronal stem cells, umbilical cord blood stem cells, hepatocytes, nerve cells, cardiomyocytes, vascular endothelial cells, vascular smooth muscle cells and blood cells. In a further aspect, the sample is cells selected from the group consisting of mesencymal stem cells, hematopoietic stem cells, embryonic stem cells, IPS cells, keratinocytes, preferable hematopoietic stem cells such as CD34 positive blood stem cells, mesenchymal stem cells embryonic stem cells and IPS cells. In a further aspect the sample is selected from the group consisting of mesenchymal stem cells and hematopoietic stem cells. In one aspect, the cell is of animal or human origin. Examples of organs are lung, liver, kidney, heart, ovaries and pancreas. Examples of tissues are tissues of bone marrow, skin, ovaries, testis, blood vessels, connective tissue, preferable tissues of ovaries and connective tissue. In a further aspect, the blood is selected from the group consisting of umbilical cord blood, and mobilized peripheral blood, preferable umbilical cord blood. In a further aspect, the sample is a cell-containing body fluid such as blood, menstrual fluid or amniotic fluid.

Depending on the specific sample to be cryoprotected, the cryoprotectant is typically present in the composition to be cryopreserved in an amount from 1 to 50% w/w such as from 2 to 50% w/w, such as from 4 to 45% w/w, or from 6 to 20% w/w, or from 6 to 12% w/w, or preferably from 6 to 10% w/w, or more preferably from 7 to 9% w/w. In one aspect, the cryoprotectant is present in the composition to be cryopreserved in an amount of at the most 60% w/w, such as in an amount of at the most 55% w/w, such as in an amount of at the most 50% w/w, such as in an amount of at the most 45% w/w, such as in an amount of at the most 40% w/w, such as in an amount of at the most 35% w/w. In another aspect, the cryoprotectant is typically present in an amount of at the least 2% w/w, such as present in an amount of at the least 4% w/w, such as present in an amount of at the least 6% w/w, such as present in an amount of at the least 6% w/w, such as present in an amount of at the least 7% w/w.

If the composition to be cryoprotected comprises an additional cryoprotectant such as DMSO the additional cryoprotectant typically is present in an amount of less than 8% w/w, such as from 1-8% w/w, such as for example in an amount below 5% w/w, such as below 4% w/w such as from 1-4% w/w.

In conventional cryopreservation techniques, a sample is harvested, suspended in a storage solution, and then preserved by freezing. When the sample such as cells are to be used, they are thawed, for example, cells taken from human donor sources are brought back to the normal human body temperature (i.e., approximately 37° C.), and then placed in a cell culture medium.

In the present method of cryopreservation, the sample is protected during cryopreservation by being brought into contact with a cryoprotecting agent as described herein prior to freezing to the cryopreservation temperature. By being brought into contact with the cryoprotecting agent is meant that the sample is made to be in contact in some manner with the cryoprotectant so that during the reduction of temperature to the cryopreservation temperature, the sample is protected by the cryoprotectant in the cryopreservation composition. For example, the cells may be brought into contact with the cryoprotecting agent by filling the appropriate wells of a plate to which the cells to be protected are attached, by suspending the cells in a solution of the cryoprotecting agent or by adding the cryoprotecting agent for example in freeze dried form to the cells, blood or organ already in a solution of for example buffer, or by resuspending the cell pellet after centrifugation in the cryoprotecting agent bringing the cells into a solution etc.

In one aspect, disclosed herein is a method of cryopreserving a sample, comprising the steps of bringing a sample to be cryopreserved into contact with a cryoprotecting agent as defined herein to obtain a cryopreservation composition and subsequently reducing the temperature of the cryopreservation composition to a cryopreservation temperature.

In a further aspect, a method of cryopreserving a composition as defined herein by reducing the temperature of said composition to a cryopreservation temperature is disclosed herein.

The rate of change from room temperature to 1-2° C. below the freezing point of the solution may have a major effect on ultimate viability if the cells are sensitive to thermal shock.

Between 3.5° C. and −5° C., the sample is normally induced to freeze either by the introduction of an ice crystal, by touching the surface of the media with a cold probe, by mechanical vibration, or by rapidly lowering the temperature until ice nucleation occurs. Since freezing is an exothermic process, heat must be conducted away from the freezing solution. This may be done either by keeping the samples immersed in a liquid with a low freezing point or by providing a substantial heat sink. As ice forms in the extracellular media, more and more free water becomes bound in the ice phase. Cell membranes, being hydrophobic, act as a barrier for the nucleation of intracellular ice and therefore unfrozen cells are exposed to an increasingly hypertonic solution. The extracellular salt concentration increases as a consequence of water sequestration into ice. The unfrozen cells shrink due to the transport of water out of the cell in response to the osmotic imbalance between the intracellular and extracellular fluid phases. The sample is then cooled at a finite rate which must be optimized for each cell type.

The optimal rate of cooling is determined by the permeability of the cell membrane to water, the surface-to-volume ratio of the cell, along the type and concentration of cryoprotective additives in the cryoprotecting agent as described herein. For most nucleated mammalian cells frozen in glycerol or DMSO, the optimal cooling rate usually is between about 0.3 to 10° C. per minute. Continuous cooling between about 4° C. and −80° C. is the most commonly used. Once the sample reaches approximately −80° C., it can be transferred directly into liquid nitrogen (−196° C.) or into the vapor phase of liquid nitrogen for storage. Another method used for cryopreservation is the vitrification technology in which it is possible to obtain very fast cooling rates of 1000° C.-2000° C./min. With this technology a specialized vitrification device, containing the cryopreservation composition with the sample, is directly placed into liquid nitrogen. In one aspect, the cryopreservation temperature is reached at a rate of 0.05-15, such as 0.1-10, such as 0.2-8, such as 0.3-6, such as 0.4-4, such as 0.5-2° C. per minute. In another aspect the cryopreservation temperature is reached at a rate of 500-3000, such as 800-2500, such as 1000-2000, such as 1200-1800° C. per minute.

The duration of viable cell storage at liquid nitrogen temperature is dependent predominantly on the rate of generation of free radicals caused by the cosmic ray background.

For example, the half-life for mammalian embryos stored in liquid nitrogen has been estimated to be approximately 30,000 years. It is important not to allow frozen cells to warm above their storage temperature for even brief periods of time. Intermittent warming promotes rapid migratory recrystallization, which can damage cellular structure and decrease overall viability.

In yet a further aspect, the sample are thawed after cryopreservation. The optimal rate of thawing of the sample is dependent on the freezing conditions used and the specific sample to be preserved. In general, for single cells frozen in suspension, and for tissues such as heart valves, a rapid rate of warming is desirable. Such rapid warming limits the growth of ice crystals in the frozen samples and is often an absolute requirement for high survival. With many tissues this warming can be accomplished by agitating the sample in a 37-42° C. water bath. The rationale for rapid warming is that it limits the growth of ice crystals which were formed during cooling.

Some tissues may be sensitive to rapid warming. This is due to transient osmotic shock, because the cells are exposed to an extracellular hypertonic solution as the ice melts and are forced to rehydrate in order to maintain their osmotic equilibrium. For other, more sensitive, samples, metabolic processes can be reactivated or brought up to normal levels by successive dilutions using serum or other high molecular weight polymers in the thawing medium.

Upon completion of the thawing procedure, the cells are still exposed to multimolar concentrations of cryoprotecting agents which must be gradually diluted to return the cells to an isotonic media. For mammalian cells, a stepwise dilution protocol is typically used. The dilution of the sample is normally carried out at preferably 37° C., so as to reduce the effects of both osmotic shock and cryoprotectant toxicity. In a further aspect, the concentration of said cryoprotectant is from 4 to 45% w/w, such as from 4 to 20% w/w, such as from 5 to 15% w/w, or from 6 to 12% w/w, or preferably from 6 to 10% w/w, or more preferably from 7 to 9% w/w cryoprotectant.

In a further aspect, the temperature of the sample in the cryopreservation composition is reduced to a cryopreservation temperature below −50° C., such as between −50° C. to −196° C., such as between −80° C. to −196° C.

In one aspect, the cryoprotecting agent is used in a banking method. In one aspect, the cryoprotecting agent is used in a clinical banking method. In one aspect, the cryoprotecting agent is used in a mobilized peripheral blood banking method.

In one aspect, the cryoprotecting agent is used in a clinical banking method such as in stem cell transplantation for malignant diseases or in an organ transplantation. In one aspect, the cryoprotecting agent is used in a mobilized peripheral blood banking method, marrow banking method or in an umbilical cord banking method.

In one aspect, the cryoprotecting agent is used in a marrow banking method or in an umbilical cord banking method. In one aspect, the cryoprotecting agent is used in a fat tissue banking method or in a dental pulp tissue banking method. In a further aspect, the cryoprotecting agent is used in a reproduction banking method.

In the Following Further Embodiments are Disclosed

1. A cryoprotecting agent comprising a cryoprotectant being one or more of: dextrin, dextran, isomaltooligosaccharide, and derivatives thereof, such as being one or more of: dextran, isomaltooligosaccharide, and derivatives thereof, and
   a) wherein said cryoprotecting agent comprises at least 1% w/w of one or more of isomaltooligosaccharide and derivatives thereof based on the total weight of dextrin, dextran, isomaltooligosaccharide and derivatives thereof in said agent, and/or
   b) wherein said cryoprotectant has a weight average molecular weight ($M_w$) of between 300 and 9,500 Da.

2. A cryoprotecting agent comprising one or more cryoprotectants selected from the group consisting of dextrin, dextran, isomaltooligosaccharide, and derivatives thereof, such as selected from the group consisting of dextran, isomaltooligosaccharide, and derivatives thereof, and
   a) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said cryoprotecting agent, or
   b) wherein said cryoprotectant has a weight average molecular weight ($M_w$) of between 300 and 9,500 Da, or
   c) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said cryoprotecting agent, and said cryoprotectant has a weight average molecular weight ($M_w$) of between 300 and 9,500 Da.

3. The agent according to any one of embodiments 1-2, wherein said cryoprotectant has a weight average molecular weight ($M_w$) of between 300 and 7,500 Da.

4. The agent according to any one of embodiments 1-3, wherein said cryoprotectant is one or more selected from the group consisting of isomaltooligosaccharide, and derivatives thereof having a weight average molecular weight ($M_w$) of between 300 and 1,650.

5. The agent according to any one of embodiments 1-4, wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said cryoprotecting agent.

6. The agent according to any one of embodiments 1-5, wherein said isomaltooligosaccharide, and derivatives has a weight average molecular weight ($M_w$) of between 850 and 1,650 Da.

7. The agent according to any one of embodiments 1-6 for cryopreserving a sample, and wherein said sample is selected from the group consisting of organs, cells, and tissue such as selected from the group consisting of mammalian organs, mammalian cells, and mammalian tissues.

8. The agent according to any one of embodiments 1-7 for cryopreserving a sample, and wherein said sample is for transplantation.

9. The agent according to any one of embodiments 1-8 for cryopreserving a sample, and wherein said sample is functional after cryopreservation.

10. The agent to any one of embodiments 1-9, wherein said sample is an organ, which organ is functional as measured by physiological function of said organ after cryopreservation, and/or wherein said sample is tissue, which tissue is functional as measured by ability of such tissue to integrate with surrounding tissue and/or wherein said sample is cells, which cells are functional as measured by viability of said cells after cryopreservation.

11. The agent according to any one of embodiments 1-10, wherein said cryoprotectant has a weight average molecular weight ($M_w$) of between 1,650 and 7,500 Da.

12. The agent according to any one of embodiments 1-11, wherein said cryoprotectant has a weight average molecular weight ($M_w$) of between 500 and 3,500 Da.

13. The agent according to any one of embodiments 1-12, wherein said cryoprotectant has a weight average molecular weight ($M_w$) of between 1,650 and 3,500 Da.

14. The agent according to any one of embodiments 1-13, wherein said cryoprotectant has a polydispersity Pd, wherein Pd is $\geq 1$ and $\leq 5$.

15. The agent according to any one of embodiments 1-14, wherein said cryoprotectant has a weight average molecular weight ($M_w$) of between 850 and 1,650 Da.

16. The agent according to any one of embodiments 1-15, wherein said cryoprotectant has a weight average molecular weight ($M_w$) of between 850 and 1,150 Da.

17. The agent according to any one of embodiments 1-16, wherein said cryoprotectant has a polydispersity Pd, wherein Pd is $\geq 1$ and $\leq 3$.

18. The agent according to any one of embodiments 1-17 comprising at least 10% w/w of one or more of isomaltooligosaccharide and derivatives thereof based on the total weight of dextrin, dextran, isomaltooligosaccharide and derivatives thereof in said agent.

19. The agent according to any one of embodiments 1-18, wherein the weight fraction of isomaltooligosaccharides having less than 3 glucose units is less than 15% w/w.

20. The agent according to any one of embodiments 1-19, wherein the weight fraction of isomaltooligosaccharides having more than 9 glucose units is less than 20% w/w.

21. The agent according to any one of embodiments 1-20, wherein the weight fraction of isomaltooligosaccharides having less than 3 glucose units is less than 15% and the weight fraction of isomaltooligosaccharides having more than 9 glucose units is less than 20% w/w such as less than 15% w/w, such as less than 10% w/w.

22. The agent according to any one of embodiments 1-21 comprising at least 30% w/w, at least 40% w/w, at least 50% w/w, at least 60% w/w, at least 70% w/w, at least 80% w/w, at least 90% w/w, at least 95% w/w or more of one or more of isomaltooligosaccharide and derivatives thereof based on the total weight of dextrin, dextran, isomaltooligosaccharide and derivatives thereof in said agent.

23. The agent according to any one of embodiments 1-22, wherein said cryoprotectant is isomaltooligosaccharide, such as isomaltooligosaccharide having a weight average molecular weight ($M_w$) of between 850 and 1,150 Da.

24. The agent according to any one of embodiments 1-23, wherein said isomaltooligosaccharide and derivatives thereof is dextran-based.

25. The agent according to any one of embodiments 1-24, wherein said derivative is a derivative of dextrin, dextran, and isomaltooligosaccharide selected from the group consisting of hydrogenated isomaltooligosaccharide, hydrogenated dextran, hydrogenated dextrin, oxidised isomaltooligosaccharide, oxidised dextran, oxidised dextrin, ester of dextrin, ester of dextran, ester of isomaltooligosaccharide, ether of dextrin, ether of dextran, ether of isomaltooligosaccharide, partly hydrogenated/oxidised dextrin, partly hydrogenated/oxidised dextran and partly hydrogenated/oxidised isomaltooligosaccharide, and derivatives thereof such as selected from the group consisting of hydrogenated isomaltooligosaccharide, hydrogenated dextran, hydrogenated dextrin, oxidised isomaltooligosaccharide, oxidised dextran, oxidised dextrin, DEAE-dextrin, DEAE-dextran, DEAE-isomaltooligosaccharides, carboxy$C_{1-10}$alkyl-dextrin, carboxy$C_{1-10}$alkyl-dextran, carboxy$C_{1-10}$alkyl-isomaltooligosaccharide, ester of dextrin, ester of dextran and ester of isomaltooligosaccharide, and derivatives thereof.

26. The agent according to any one of embodiments 1-25, wherein said derivative is a hydrogenated isomaltooligosaccharide, an oxidised isomaltooligosaccharide, DEAE-isomaltooligosaccharid, a carboxy$C_{1-10}$alkyl oxidised isomaltooligosaccharide or an carboxy$C_{1-10}$alkyl isomaltooligosaccharide.

27. The agent according to any one of embodiments 1-26, wherein said derivative is hydrogenated isomaltooligosaccharide, such as hydrogenated isomaltooligosaccharide having a weight average molecular weight ($M_w$) of between 850 and 1,150 Da.

28. The agent according to any one of embodiments 25-27, wherein said carboxy$C_{1-10}$alkyl isomaltooligosaccharide is carboxymethyl isomaltooligosaccharide or carboxyethyl isomaltooligosaccharide.

29. The agent according to any one of embodiments 1-28, comprising at least one additional cryoprotectant selected from the group consisting of acetamide, agarose, alginate, 1-analine, albumin, ammonium acetate, butanediol, chondroitin sulfate, chloroform, choline, diethylene glycol, dimethyl acetamide, dimethyl formamide, dimethyl sulfoxide (DMSO), erythritol, ethanol, ethylene glycol, formamide, glucose, glycerol, a-glycerophosphate, glycerol monoacetate, glycine, hydroxyethyl starch, inositol, lactose, magnesium chloride, magnesium sulfate, maltose, mannitol, mannose, methanol, methyl acetamide, methylformamide, methyl ureas, phenol, pluronic polyols, polyethylene glycol, polyvinylpyrrolidone, proline, propylene glycol, pyridine N-oxide, ribose, serine, sodium bromide, sodium chloride, sodium iodide, sodium nitrate, sodium sulfate, sorbitol, sucrose, trehalose, triethylene glycol, trimethylamine acetate, urea, valine and xylosen.

30. The agent according to any one of embodiments 1-29, wherein said additional cryoprotectant is DMSO.

31. The agent according to any one of embodiments 1-30 which is substantially free of DMSO.

32. The agent according to embodiment 31 which is free of DMSO.

33. The agent according to any one of embodiments 1-32 comprising a cryoprotectant as defined in embodiment 1 as the only cryoprotectant.

34. The agent according to any one of embodiments 1-33, wherein said agent is in the form of a powder.

35. The agent according to any one of embodiments 1-34, wherein said agent is in the form of a lyophilized or spray dried powder.

36. The agent according to any one of embodiments 1-35, wherein said agent is in the form of a solution.

37. The agent according to any one of embodiments 1-36, wherein said agent comprises from 30% to 70% w/w of said cryoprotectant, such as from 40% to 65% w/w or from 50% to 60% w/w of said cryoprotectant.

38. The agent according to any one of embodiments 1-37, wherein said agent comprises from 30% to 70% w/w of said additional cryoprotectant, such as from 40% to 65% w/w or from 50% to 60% w/w of said additional cryoprotectant.

39. The agent according to any one of embodiments 1-38 further comprising a growth medium or substrate for a sample to be cryopreserved.

40. The agent according to any one of embodiments 1-39 further comprising any proteins belonging to the IAPs (Inhibitors of apoptosis), inhibitors of the rho-associated protein kinase (ROCK) signaling pathways, and/or any growth factor such as EGF, FGF, PDGF, IGF, EPO, BDNF, TGF, TNF and/or VEGF.

41. The agent according to any one of embodiments 1-40 further comprising any serum component of human, bovine, equine, or canine origin.

42. The agent according to any one of embodiments 1-41, wherein said cryoprotectant is sterile.

43. A cryopreservation composition comprising a cryoprotecting agent as defined in any one of embodiments 1-42, which cryopreservation composition further comprises a sample to be cryopreserved.

44. The cryopreservation composition according embodiment 43, wherein the sample is selected from the group consisting of organs, cells such as isolated cells or cell-containing bodily fluids for example blood, and tissues.

45. The cryopreservation composition according embodiment 44, wherein the sample is selected from the group consisting of mammalian organs, mammalian cells, and mammalian tissues, such as a sample selected from the group consisting of mammalian organs, mammalian cells, and mammalian tissues for transplantation.

46. The cryopreservation composition according to any one of embodiments 43-45, wherein said sample is cells selected from the group consisting of somatic cells, including all kind of tissue derived cells such as mesenchymal stem cells, tissue-specific progenitor cells, keratinocytes, fibroblasts, chondrocytes, bone cells, or cardiomyocytes, blood derived cells such as hematopoietic stem cells, macrophages, plates, erythrocytes, or stem cells, including all types of pluripotent cells, totipotent cells and unipotent cells, and germ layer cells.

47. The cryopreservation composition according to any one of embodiments 43-46, wherein said sample is cells selected from the group consisting of keratinocytes, fibroblasts, mesenchymal stem cells, macrophages, and hematopoietic stem cells such as CD34 positive blood stem cells.

48. The cryopreservation composition according to any one of embodiments 43-45, wherein said sample is tissue selected from the group consisting of ovarian tissue, testicular tissue, umbilical cord tissue, placental tissue, connective tissue, cardiac tissue, tissue from muscle, bone, and cartilage tissue, endocrine tissue, and neural tissue.

49. The cryopreservation composition according to any one of embodiments 43-45, wherein said sample is a cell-containing bodily fluid selected from the group consisting of blood such as umbilical cord blood, peripheral blood, and mobilized peripheral blood, amniotic fluid, semen, cerebrospinal fluid, menstrual fluid blood, and bone marrow aspirates.

50. The cryopreservation composition according to any one of embodiments 43-45, wherein said sample is an organ selected from the group consisting of lung, heart, kidney, liver, umbilical cord and ovaries.

51. The cryopreservation composition according to any one of embodiments 43-45 comprising said cryoprotectant in an amount from 1 to 50% w/w such as from 2 to 50% w/w, or from 4 to 45% w/w, or from 6 to 12% w/w, or preferably from 6 to 10% w/w, or more preferably from 7 to 9% w/w.

52. The cryopreservation composition according to any one of embodiments 43-51, wherein said composition comprises DMSO in an amount of less than 8% w/w, such as from 1-8%.

53. The cryopreservation composition according to any one of embodiments 43-52, wherein said sample is functional after cryopreservation.

54. The cryopreservation composition according to any one of embodiments 43-53, wherein said composition comprises DMSO in an amount of less than 8% w/w, less than 4% w/w such as from 1-4%.

55. A method of cryopreserving a sample, comprising bringing a sample to be cryopreserved into contact with a cryoprotecting agent as defined in any one of embodiments 1-42 to obtain a cryopreservation composition and subsequently reducing the temperature of the cryopreservation composition to a cryopreservation temperature.

56. The method according to embodiment 55, wherein the cryopreservation composition is as defined in any one of embodiments 43-54.

57. A method of cryopreserving a composition as defined in any one of embodiments 43-56 by reducing the temperature of said composition to a cryopreservation temperature.

58. The method according to any one of embodiments 55-57, wherein the cryopreservation temperature is reached at a rate of 0.05-15, such as 0.1-10, such as 0.2-8, such as 0.3-6, such as 0.4-4, such as 0.5-2° C. per minute.

59. The method according to any one of embodiments 55-58, wherein the concentration of said cryoprotectant is from 4 to 20% w/w such as from 5 to 15% w/w, or from 6 to 12% w/w, or preferably from 6 to 10% w/w, or more preferably from 7 to 9% w/w.

60. The method according to any one of embodiments 55-59, wherein the temperature of the sample in the cryopreservation composition is reduced to a temperature below −50° C., such as between −50° C. to −196° C., such as −80° C. to −196° C.

61. The method according to any one of embodiments 55-60, wherein the sample is thawed after cryopreservation.

62. The method according to any one of embodiments 55-61, wherein said sample is functional after cryopreservation.

63. The method according to any one of embodiments 55-62, wherein the sample to be cryopreserved is selected from the group consisting of organs, cells, and tissues.

64. The method according to any one of embodiments 55-63, which is in a clinical banking method.

65. The method according to any one of embodiments 55-64, which is in a banking method such as a mobilized peripheral blood banking method, marrow banking method, a fat tissue banking method, a dental pulp tissue banking method, a reproduction banking method or in an umbilical cord banking method.

66. Use of a cryoprotecting agent comprising one or more cryoprotectants selected from the group consisting of dextrin, dextran, isomaltooligosaccharide, and derivatives thereof, such as selected from the group consisting of dextran, isomaltooligosaccharide, and derivatives thereof; and a) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said cryoprotecting agent, or b) wherein said cryoprotectant has a weight average molecular weight ($M_w$) of between 300 and 9,500 Da, or c) wherein said cryoprotecting agent comprises at least 1% w/w of one or more of isomaltooligosaccharide and derivatives thereof having a weight average molecular weight ($M_w$) of between 300 and 1,650 Da based on the total weight of dextrin, dextran, isomaltooligosaccharide and derivatives thereof in said cryoprotecting agent, and said cryoprotectant has a weight average molecular weight ($M_w$) of between 300 and 9,500 Da, for cryopreserving a sample, and wherein said sample is selected from the group consisting of organs, cells, and tissue.

67. The use of a cryoprotecting agent according to embodiment 66, wherein said cryoprotectant has a weight average molecular weight ($M_w$) of between 300 and 7,500 Da.

68. Use of a cryoprotecting agent selected from the group consisting of isomaltooligosaccharide and derivatives thereof having a weight average molecular weight ($M_w$) of between 300 and 1,650 Da such as having a weight average molecular weight ($M_w$) of between 850 and 1,650 Da, for cryopreserving a sample wherein said sample is selected from the group consisting of organs, cells, and tissue.

69. The use of a cryoprotecting agent as defined in any one of embodiments 1-42 for cryopreserving a sample such as a sample selected from the group consisting of organs, cells, and tissue.

70. The use according to any one of embodiments 66-69 comprising bringing said sample to be cryopreserved into contact with said agent to obtain a cryopreservation composition and subsequently reducing the temperature of the cryopreservation composition to a cryopreservation temperature.

71. Use of a cryopreservation composition as defined in any one of embodiments 43-54 for cryopreserving a sample by reducing the temperature of said composition to a cryopreservation temperature.

72. The use according to any one of embodiments 66-71, wherein the cryopreservation temperature is reached at a rate of 0.05-15, such as 0.1-10, such as 0.2-8, such as 0.3-6, such as 0.4-4, such as 0.5-2° C. per minute.

73. The use according to any one of embodiments 66-72, wherein the concentration of said cryoprotectant is from 4 to 20% w/w such as from 5 to 15% w/w, or from 6 to 12% w/w, or preferably from 6 to 10% w/w, or more preferably from 7 to 9% w/w cryoprotectant.

74. The use according to any one of embodiments 66-73, wherein the temperature of the sample in the cryopreservation composition is reduced to a temperature below −50° C., such as between −50° C. to −196° C., such as −80° C. to −196° C.

75. The use according to any one of embodiments 66-74, wherein the sample is thawed after cryopreservation.

76. The use according to any one of embodiments 66-75, wherein said sample is functional after cryopreservation.

77. The use according to any one of embodiments 66-76, wherein the sample to be cryopreserved is selected from the group consisting of organs, cells, and tissues for transplantation.

78. The use according to any one of embodiments 66-77, which is in a banking method such as a mobilized peripheral blood banking method, marrow banking method, fat tissue banking method, a dental pulp tissue banking method, a reproduction banking method or in an umbilical cord banking method.

79. The use according to any one of embodiments 66-78, which is in a clinical banking method.

All publications mentioned in the above specification are herein incorporated by reference. Various modifications and variations of the described compositions, methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments.

Preparation Example 1

Production of Isomaltooligosaccharide 1

Hydrolysis of Low Molecular Dextran 3345 kg hydrolysed dextran collected as permeate from a membrane having a cut-off value <5,000 Daltons, is hydrolysed at pH 1.5 at a temperature of 95° C.

The hydrolysis is monitored chromatographically using gel permeation chromatography (GPC), and is terminated by cooling when the molecular weight of the material being hydrolysed is estimated to have achieved the desired value, i.e. a weight average molecular weight of 850-1,150 Daltons.

By the hydrolysis low molecular weight isomaltooligosaccharide is produced but also glucose is formed. After cooling and neutralization the amount of glucose and very low molecular weight oligomers is reduced by membrane processes having a cut-off value of 340-800 Daltons. After this process, the content of isomaltooligosaccharide is determined by optical rotation ($\alpha_D 20\sim 200$) to be 915 kg, and the amount of reducing sugar is determined by use of Somogyi's reagent to be 22.5%.

TABLE 1

Results from GPC analysis.

| Number of glucose units In molecule | AUPW | Relative AUPW | Mi | Contribution to $M_W$ | AUPN | Relative AUPN | Contribution to $M_n$ |
|---|---|---|---|---|---|---|---|
| 1 | 0.48 | 0.0028 | 180 | 1 | 0.0027 | 0.0130 | 2 |
| 2 | 5.94 | 0.0350 | 342 | 12 | 0.0174 | 0.0846 | 29 |
| 3 | 21.76 | 0.1282 | 504 | 65 | 0.0432 | 0.2103 | 106 |
| 4 | 28.3 | 0.1667 | 666 | 111 | 0.0425 | 0.2070 | 138 |
| 5 | 26.94 | 0.1587 | 828 | 131 | 0.0325 | 0.1585 | 131 |
| 6 | 22.58 | 0.1330 | 990 | 132 | 0.0228 | 0.1111 | 110 |
| 7 | 17.43 | 0.1027 | 1152 | 118 | 0.0151 | 0.0737 | 85 |
| 8 | 13.46 | 0.0793 | 1314 | 104 | 0.0102 | 0.0499 | 66 |
| 9 | 9.73 | 0.0573 | 1476 | 85 | 0.0066 | 0.0321 | 47 |
| 10 | 6.91 | 0.0407 | 1638 | 67 | 0.0042 | 0.0206 | 34 |
| 11 | 4.89 | 0.0288 | 1800 | 52 | 0.0027 | 0.0132 | 24 |
| 12 | 3.66 | 0.0216 | 1962 | 42 | 0.0019 | 0.0091 | 18 |
| 13 | 2.5 | 0.0147 | 2124 | 31 | 0.0012 | 0.0057 | 12 |
| 14 | 5.2 | 0.0306 | 2286 | 70 | 0.0023 | 0.0111 | 25 |
|   | 169.78 | 1.0000 |   | 1020 | 0.2053 | 1.0000 | 827 |

AUPW: Area under peak ($M_w$)
AUPN: Area under peak ($M_n$)

As seen from above Table 1 the Isomaltooligosaccharide has a MW of 1020 Da and Mn equals 827 Da giving a polydispersity Pd=1.23. The reducing sugar is measured to be 22.5%. This isomaltooligosahharide is also named pentaisomaltose in this application.

Preparation Example 2

Production of Hydrogenated Isomaltooligosaccharide 1

After hydrolysis and fractionation 418 kg isomaltooligosaccharide was left. The reducing sugar was measured to 30.8%. This amount was treated with 10 kg Sodium borohydride and gave as a result 362 kg hydrogenated isomaltooligosaccharide before final ion exchange. Hereafter the solution was neutralized to pH<7.0, and subsequently de-ionized and finally spray dried. The reducing sugar of the final product was measured to 0.09%.

TABLE 2

Results from GPC analysis.

| Number of glucose units | AUPW | Relative AUPW | Mi | Contribution to $M_W$ | AUPN | Relative AUPN | Contribution to $M_n$ |
|---|---|---|---|---|---|---|---|
| 1 | 0.31 | 0.0033 | 180 | 1 | 0.0017 | 0.0145 | 3 |
| 2 | 4.38 | 0.0472 | 342 | 16 | 0.0128 | 0.1076 | 37 |
| 3 | 14.55 | 0.1568 | 504 | 79 | 0.0289 | 0.2425 | 122 |
| 4 | 16.47 | 0.1775 | 666 | 118 | 0.0247 | 0.2077 | 138 |
| 5 | 14.65 | 0.1579 | 828 | 131 | 0.0177 | 0.1486 | 123 |
| 6 | 11.57 | 0.1247 | 990 | 123 | 0.0117 | 0.0982 | 97 |
| 7 | 8.61 | 0.0928 | 1152 | 107 | 0.0075 | 0.0628 | 72 |
| 8 | 6.57 | 0.0708 | 1314 | 93 | 0.0050 | 0.0420 | 55 |
| 9 | 4.77 | 0.0514 | 1476 | 76 | 0.0032 | 0.0271 | 40 |
| 10 | 3.43 | 0.0370 | 1638 | 61 | 0.0021 | 0.0176 | 29 |
| 11 | 2.43 | 0.0262 | 1800 | 47 | 0.0014 | 0.0113 | 20 |
| 12 | 1.76 | 0.0190 | 1962 | 37 | 0.0009 | 0.0075 | 15 |
| 13 | 1.19 | 0.0128 | 2124 | 27 | 0.0006 | 0.0047 | 10 |
| 14 | 2.11 | 0.0227 | 2286 | 52 | 0.0009 | 0.0078 | 18 |
| | 92.80 | 1.0000 | | 968 | 0.1190 | 1.0000 | 780 |

AUPW: Area under peak ($M_w$)
AUPN: Area under peak ($M_n$)

As seen from above table 2 the hydrogenated isomaltooligosaccharide has a $M_w$ of 968 Da and $M_n$ equals 780 Da giving a polydispersity Pd=1.24. This hydrogenated isomaltooligosahharide is also named pentaisomaltoside in this application.

Example 1

Preparation of Cryopreservation Agent

The cryopreservation agent used in the following examples were prepared by aseptically solubilizing the cryoprotectant (such as DMSO, pentaisomaltose (isomaltooligosaccharide 1) prepared as described in Preparation Example 1 or pentaisomaltoside (hydrogenated isomaltooligosaccharide 1) prepared as described in Preparation Example 2) in growth medium (DMEM/F12+ 10% FBS+penicillin/streptomycin) to the desired final concentration (e.g. for 8% isomaltooligosaccharide 1 cryopreservation composition, 8 gram to 100 ml growth medium) and filter sterilize the individual cryopreservation compositions.

Example 2

Cryopreservation of Normal Human Dermal Fibroblasts (NHDF)

NHDF (passage 2) were cultured in conventional T-flasks under standard conditions (37° C., 5% $CO_2$ and standard growth medium [DMEM/F12+10% FBS+penicillin/streptomycin)]). When reaching confluence (70-80%) the cell population was released from the flasks and centrifuged (1000 rpm, 10 min). $0.5 \times 10^6$ cells were re-suspended in six different cryopreservation agents (1 ml); 1) Growth medium+10% DMSO, 2) Growth medium+2% DMSO+8% isomaltooligosaccharide 1, 3) Growth medium+2% DMSO+ 8% hydrogenated isomaltooligosaccharide 1, 4) Growth medium+8% isomaltooligosaccharide 1, 5) Growth medium+8% hydrogenated isomaltooligosaccharide 1 and 6) Growth medium without any additives (DMEM/F12 without FBS). The cells were then cryopreserved under standard controlled cryopreservation conditions using isopropanol based methodology, freezing at the constant rate 1° C./min down to the temperature of liquid $N_2$. After one week the cells were thawed using a standard thawing protocol (directly immerse vial in water bath, 37 degrees and transfer of cell solution drop wise to fresh 37° C. growth medium). The following analysis was done after thawing; 1) viability, using the Nucleocounter equipment (NC200), and 2) viability at 1.passage using Nucleocounter equipment (NC200). The results are shown in FIGS. 1 and 2 and summarized in table 3-5.

The viability after thawing is slightly reduced when using isomaltooligosaccharide 1 as the only cryopreservation agent as compared to standard condition using 10% DMSO. When using 2% DMSO together with isomaltooligosaccharide 1 no difference with regard to viability is observed. The viability of cells cryopreserved with isomaltooligosaccharide 1 alone at 1.passage is similar to standard conditions using 10% DMSO. This experiment demonstrates that cryopreserving NHDF in a cryopreservation solution using isomaltooligosaccharide 1 as the only cryoprotectant results in cultures that can be used to the same extent as cultures from standard cryopreservation conditions.

Example 3

Cryopreservation of Normal Human Keratinocytes (NHEKs)

NHEKs were cryopreserved using the same protocol as described in Example 2. The same experimental groups were included. Results are shown in FIGS. 3-4 and are summarized in table 3-5.

As also shown for NHDF, the results clearly demonstrate that NHEKs can be cryopreserved in a cryopreservation solution using isomaltooligosaccharide 1 as the only cryoprotectant. The viability at first passage of culture is at the same level as NHEKS cryopreserved under standard conditions using 10% DMSO.

Example 4

Cryopreservation of Normal Human Mesenchymal Stem Cells (hMSCs)

hMSCs were cryopreserved using the same protocol as described in Example 2 with two more experimental groups included, growth medium+8% isomaltooligosaccharide 1+2% trehalose and growth medium+2% trehalose. Viability analysis was done, using the Nucleocounter technique as described above. The results are shown in FIG. 5 and summarized in table 3-5.

The results clearly demonstrate that hMSCs can be cryopreserved in a cryopreservation solution using isomaltooligosaccharide Da as the only cryoprotectant. The viability after thawing is shown to be at the same level as the standard formulation containing 10% DMSO.

Table 3-5:
T1: Survival after thawing
T2: Survival after 1.passage

TABLE 3

| 10% | NHDF | | NHEK | | hMSC | |
| --- | --- | --- | --- | --- | --- | --- |
| DMSO | T1 | T2 | T1 | T2 | T1 | T2 |
| 10% DMSO | 96 ± 5% | 92 ± 2% | 92 ± 3% | 88 ± 5% | 84 ± 10% | N/A |
| 10% DMSO | 98 ± 2% | 95 ± 2% | 75 ± 4% | N/A | 90 ± 2% | N/A |

TABLE 4

| | NHDF | | NHEK | | hMSCs | |
| --- | --- | --- | --- | --- | --- | --- |
| | T1 | T2 | T1 | T2 | T1 | T2 |
| 2% DMSO + 8% isomaltooligosaccharide 1 | 96 ± 5% | 92 ± 2% | 93 ± 2% | 96 ± 1% | 95 ± 1% | N/A |
| 2% DMSO + 8% Hydrogenated isomaltooligosaccharide 1 | 98 ± 1% | 96 ± 1% | 81 ± 5% | N/A | 90 ± 3 | N/A |

TABLE 5

| | NHDF | | NHEK | | hMSC | |
| --- | --- | --- | --- | --- | --- | --- |
| | T1 | T2 | T1 | T2 | T1 | T2 |
| 8% isomaltooligosaccharide 1 | 75 ± 5% | 85 ± 5% | 74 ± 1% | 85 ± 8% | 80 ± 7% | N/A |
| 8% Hydrogenated isomaltooligosaccharide 1 | 82 ± 5% | 90 ± 3% | 85 ± 11% | N/A | 80 ± 5 | N/A |

Example 5

Exposure of hMSCs to Isomaltooligosaccharide 1 hMSCs were grown to confluence in conventional T-flasks. Cells were released and resuspended in two different formulations 1) growth medium+10% DMSO and 2) 8% isomaltooligosaccharide 1. The final concentration of cells in each formulation was of $1\times10^6$/ml cells. The same basic protocol as described in Example 2 was used. 1 ml from each vial were added to cryovials and viability was analysed using the NucleoCounter at three different time points; 1) 0 min (TO), 10 min (T10) and 30 min (T30). Results are summarized in table 6.

TABLE 6

| | T0 (%) | T10 (%) | T30 (%) |
| --- | --- | --- | --- |
| 10% DMS0 | 100 | 67 | 41 |
| 8% isomaltooligosaccharide 1 | 100 | 97 | 95 |

It is clearly demonstrated that exposure to standard cryopreservation conditions seriously affects the viability of hMSCs. Exposure to the cryoformulation with isomaltooligosaccharide 1 as the only cryoprotectant component only affects the viability significantly after exposure for 60 min. This demonstrates that it is possible to handle cell cultures for cryopreservation in the cryopreservation composition containing isomaltooligosaccharide 1, making more flexible working procedures possible.

Example 6

Isomaltooligosaccharide 560 Da for Cryopreservation of hMSCs hMSCs were cryopreserved using the same basic protocol as described in Example 2 and the same experimental groups were included. The results demonstrate that it is possible to cryopreserve hMSCs in isomaltooligosaccharide 560 Da, however hydrogenated isomaltooligosaccharide 560 Da is not as effective as isomaltooligosaccharide 560 Da in this experiment. Results are summarized in table 7.

TABLE 7

| 10% DMSO | 8% isomaltooligosaccharide 560 Da + 2% DMSO | 8% isomaltooligosaccharide 560 Da | 8% Hydrogenated isomaltooligosaccharide 560 Da + 2% DMSO | 8% Hydrogenated isomaltooligosaccharide 560 Da |
|---|---|---|---|---|
| 90 ± 1% | 66 ± 15% | 78 ± 1% | 60 ± 1% | 44 ± 5% |

Example 7

Human iPS Cells in PluriPro Growth Medium

The isomaltooligosaccharide 1 used in this example is prepared as described in Preparation example 1. Human induced pluripotent stem cells, iPSCs, (passage 12) were cultured in conventional T-flasks as single cells under standard conditions (37 degrees, 5% $CO_2$ and PluriPro growth medium, Cell Guidance System). When reaching confluence (70-80%) the cell population was released from the flasks and centrifuged (1000 rpm, 10 min). $0.5 \times 10^6$ cells were resuspended in twelve different cryopreservation solutions (1 ml); Growth medium+10% DMSO, Growth medium+5% DMSO, Growth medium+10% DMSO+2% isomaltooligosaccharide 1, Growth medium+10% DMSO+4% isomaltooligosaccharide 1, Growth medium+10% DMSO+8% isomaltooligosaccharide 1, Growth medium+5% DMSO+2% isomaltooligosaccharide 1, Growth medium+5% DMSO+4% isomaltooligosaccharide 1, Growth medium+5% DMSO+8% isomaltooligosaccharide 1, Growth medium+2% isomaltooligosaccharide 1, Growth medium+4% isomaltooligosaccharide 1, Growth medium+8% isomaltooligosaccharide 1, and Growth medium without any cryoprotectant. The cells were then cryopreserved under standard controlled cryopreservation conditions (using an isopropanol based methodology) down to liquid $N_2$. After one week the cells were thawed using standard thawing protocol (directly immerse vial in water bath, 37 degrees and transfer of cell solution dropwise to fresh growth medium). ROCK inhibitor was added under the first seeding. Viability analysis after thawing was done, using the Nucleocounter technique. The results are shown in FIG. 6.

The results demonstrate that human iPS cells can be cryopreserved using isomaltooligosaccharide 1 as the only cryoprotectant, although the viability of the cryopreserved cells is significantly lower than cases where DMSO is added.

Example 8

Human iPS Cells in PluriPro Growth Medium

The hydrogenated isomaltooligosaccharide 1 used in this example is prepared as described in Preparation example 2. Human induced pluripotent stem cells, iPSCs, (passage 12) were cultured in conventional T-flasks as single cells under standard conditions (37 degrees, 5% $CO_2$ and PluriPro growth medium, Cell Guidance System). When reaching confluence (70-80%) the cell population was released from the flasks and centrifuged (1000 rpm, 10 min). $0.5 \times 10^6$ cells were resuspended in twelve different cryopreservation solutions (1 ml); Growth medium+10% DMSO, Growth medium+5% DMSO, Growth medium+10% DMSO+2% hydrogenated isomaltooligosaccharide 1, Growth medium+10% DMSO+4% hydrogenated isomaltooligosaccharide 1, Growth medium+10% DMSO+8% hydrogenated isomaltooligosaccharide 1, Growth medium+5% DMSO+2% hydrogenated isomaltooligosaccharide 1, Growth medium+5% DMSO+4% hydrogenated isomaltooligosaccharide 1, Growth medium+5% DMSO+8% hydrogenated isomaltooligosaccharide 1, Growth medium+2% hydrogenated isomaltooligosaccharide 1, Growth medium+4% hydrogenated isomaltooligosaccharide 1, Growth medium+8% hydrogenated isomaltooligosaccharide 1 and Growth medium without any cryoprotectant. The cells were then cryopreserved under standard controlled cryopreservation conditions (using an isopropanol based methodology) down to liquid $N_2$. After one week the cells were thawed using standard thawing protocol (directly immerse vial in water bath, 37 degrees and transfer of cell solution dropwise to fresh growth medium). ROCK inhibitor was added under the first seeding. Viability analysis after thawing was done, using the Nucleocounter technique. The results are shown in FIG. 7.

The results demonstrate that human iPS cells can be cryopreserved using hydrogenated isomaltooligosaccharide 1 as the only cryoprotectant, although the viability of the cryopreserved cells is significantly lower than cases where DMSO is added. In the samples cryopreserved without DMSO, a tendency to improved viability as a function of used Isomaltooligosaccharide 1 concentration was observed.

Example 9

Cryopreservation of Normal Human Mesenchymal Stem Cells (hMSCs) in Cryoprotectants with Different Molecular Weights hMSCs were cryopreserved using the same protocol as described in Example 2 involving the following experimental groups, growth medium+10% DMSO, 8% isomaltooligosaccharide 1, Dextran average Mw 10.000 or Dextran average Mw 40.000+5% DMSO, 8% isomaltooligosaccharide 1, Dextran average Mw10.000 or Dextran average Mw 40.000+1% DMSO, 8% isomaltooligosaccharide 1, Dextran average Mw10.000 or Dextran average Mw 40.000 and growth medium. Viability analysis was done, using the Nucleocounter technique as described above. After thawing MSCs were cultured for 3 days under standard conditions and the proliferative rate was analysed by using colorimetric in vitro analysis, MTT assay that measures the mitochondrial activity in the cell population.

The results are shown in FIG. 8.

The results clearly demonstrate that hMSCs can be cryopreserved in a cryopreservation solution using isomaltooligosaccharide 1, Dextran average Mw 10.000 or Dextran average Mw 40.000 as the only cryoprotectant. No significant difference was observed between Mw on the direct viability analysis after thawing. However the analysis of the proliferative rate after 3 days demonstrated that hMSCs cryopreserved in 8% isomaltooligosaccharide 1 (average Mw 1000) proliferated more actively compared to 8% Dextran average Mw 10.000 and average Mw 40.000.

Example 10

Cryopreservation of Normal Human Mesenchymal Stem Cells (hMSCs) in Isomaltooligosaccharide Having an Average Mw 1500 Mw hMSCs were cryopreserved using the same protocol as described in Example 2 involving the following experimental groups, growth medium+10% DMSO, growth medium+2% DMSO, 8% isomaltooligosaccharide having an average Mw 1500 Mw+2% DMSO, 8% isomaltooligosaccharide having an average Mw 1500 Mw and growth medium. Viability analysis was done, using the Nucleocounter technique as described above. The results are shown in FIG. 9.

The results clearly demonstrate that hMSCs can be cryopreserved in a cryopreservation solution using isomaltooligosaccharide having an average Mw 1500 as the only cryoprotectant.

Example 11

Viability of CD34$^+$ Hematopoietic Stem Cell Following Cryopreservation with DMSO, Isomaltooligosaccharide 1 or Hydrogenated Isomaltooligosaccharide 1

Mobilized peripheral blood cells were harvested by leukapheresis and frozen in cryoprotective medium containing 10% DMSO or different concentrations of isomaltooligosaccharide 1 (isom) or hydrogenated isomaltooligosaccharide 1 (h-isom). Samples were frozen using a controlled rate freezer (Kryo 560-16, Planer; start temp. 4° C., –1° C./min drop to 0° C., –2° C./min drop to –45° C. and –5° C./min drop to –100° C.) and moved to –150° C. Samples were thawed in a 37° C. water bath. Flow cytometry was applied to estimate the viability of CD45+, CD34+ hematopoietic stem cells. The fluorescent DNA binding compound 7-Aminoactinomycin D (7-AAD) was used as a live/dead marker. Cells able to exclude 7AAD were assumed to be viable. The results are shown in FIG. 10: Isomaltooligosaccharide 1 (light grey bars), hydrogenated isomaltooligosaccharide 1 (dark grey bars) and DMSO (black bars). Data shown here are from 3 separate experiments, each measured in doublets. Error bars indicate the standard deviation.

Both h-isom and isom supports the viability of CD34+ hematopoietic cells after cryopreservation to the same extent as standard 10% DMSO. A clear tendency towards a higher protective effect with higher concentrations of both i-som and isom is demonstrated. Concentrations of 4% exert a significant lesser protective effect (below 60%) than concentrations of 6%, 8%, 10% and 12%. Concentrations of 10% and 12% have similar protective effect as compared to 10% DMSO. No significant difference between the protective effects of h-isom and isom was observed in the study.

Example 12

Viability of Adipose-Derived Stromal/Stem Cells (ASC's) Following Cryopreservation with DMSO, Isomaltooligosaccharide 1 or Hydrogenated Isomaltooligosaccharide 1

ASC's were harvested from adipose tissue obtained by cosmetic liposuction of the abdomen or the inner thighs using the Vibrasat device (Möller Medical GmbH & Co. KG, Fulda, Germany). The ASC's from the stromal vascular fraction were expanded ex vivo in culture medium consisting of Dulbecco's modified Eagle's medium, 1% penicillin-streptomycin, 1% GlutaMAX, and 10% pooled human platelet lysate. Cells were frozen in cryoprotective medium containing 10% DMSO or different concentrations of isomaltooligosaccharide 1 (isom) or hydrogenated isomaltooligosaccharide 1 (h-isom). Samples were frozen using a controlled rate freezer (Kryo 560-16, Planer; start temp. 4° C., –1° C./min drop to 0° C., –2° C./min drop to –45° C. and –5° C./min drop to –100° C.) and moved to –150° C. Samples were thawed in a 37° C. water bath. Flow cytometry was applied for phenotype characterization (positive for CD73, CD90, CD105 and negative for CD14, CD20, CD45 and CD34) and to estimate the viability of ASC's. The fluorescent DNA binding compound 7-Aminoactinomycin D (7-AAD) was used as a live/dead marker. Cells able to exclude 7AAD were assumed to be viable. The results are shown in FIG. 11: Isomaltooligosaccharide 1 (light grey bars), hydrogenated isomaltooligosaccharide 1 (dark grey bars) and DMSO (black bars). Data shown here are from a single experiment measured in doublets. Error bars indicate the standard deviation. The result for DMSO is lower than expected.

Both h-isom and isom as cryoprotectants supports the viability ASCs to the same extent as 10% DMSO. Except for low concentration of 4%, higher concentrations results in a viability above 70%. A concentration of 12% results in a significantly higher viability (80%-90%) compared to lower concentrations. No significant difference between the cryoprotective effects of h-isom and isom was observed in the study except for the 4% group.

Example 13

After removal of mouse ovaries, they are transferred to a McCoy medium supplemented with 10 mg/ml HSA, pen/strep and kept at 37° C. until they are transferred to below cryopreservation solutions: 1) standard conditions (PBS, 1.5 mol/L ethylene glycol, 0.1 mol/L sucrose, 10 mg/ml HSA similar to cryopreservation of human ovarian tissue) or 2) with PBS, 10° A) (w/v) Isomaltooligosaccharide 1.

The ovaries are equilibrated for 30 min on ice and then transferred to a programmable cryofreezer (Planner Cryo 10 programmable freezer, UK) where the samples are cooled to –140° C. with the following ramps (start temp: –1° C.; –2° C./min until –9° C.; holding 5 min; seeding; –0.3° C./min until –40° C., –10° C./min until –140C and then directly in liquid nitrogen). After this, they are plunged into liquid nitrogen and kept in a liquid nitrogen tank for a variable time period. Thawing: room temperature in 37C hot water; 10 min a medium with Isomaltooligosaccharide 1 (20° A) (w/v) and then directly into fixation medium. On histological preparations both ovaries show surviving follicles in different stages of development.

Example 14

Mouse ovaries are treated as described in above Example 13 but in below cryopreservation solutions: 1) standard conditions (PBS, 1.5 mol/L ethylene glycol, 0.1 mol/L sucrose, 10 mg/ml HSA similar to cryopreservation of human ovarian tissue) or 2) with PBS, 1.5 mol/L ethylene glycol, 10 mg/ml HSA, 10° A) (w/v) hydrogenated isomaltooligosaccharide 1 or 3) with PBS, 10 mg/ml HSA, 10° A) (w/v) hydrogenated isomaltooligosaccharide 1. On histological preparations all ovaries show surviving follicles in different stages of development.

The invention claimed is:

1. A method of protecting a sample from freezing damage, comprising the steps of:
   (i) bringing a sample comprising peripheral blood derived hematopoietic stem cells to be cryopreserved into contact with a cryoprotective medium comprising a cryoprotecting agent to obtain a cryopreservation composition;
   (ii) subsequently reducing the temperature of the cryopreservation composition to a cryopreservation temperature,
   where said cryoprotecting agent comprises one or more cryoprotectants selected from isomaltooligosaccharide and hydrogenated isomaltooligosaccharide,
   wherein said one or more cryoprotectants has a weight average molecular weight (Mw) of between 850 and 1,150 Da, and the cryoprotective composition is substantially free of dimethyl sulfoxide (DMSO).

2. The method according to claim 1, wherein at least one of the one or more cryoprotectants has a polydispersity of ≥1 and ≤5.

3. The method according to claim 1, wherein said one or more cryoprotectants is an isomaltooligosaccharide having a weight average molecular weight (Mw) of between 850 and 1,150 Da.

4. The method according to claim 1, wherein said one or more cryoprotectants is an hydrogenated isomaltooligosaccharide having a weight average molecular weight (Mw) of between 850 and 1,150 Da.

5. The method according to claim 1, wherein the weight fraction of isomaltooligosaccharides in the cryoprotective medium having less than 3 glucose units is less than 15% w/w and/or wherein the weight fraction of isomaltooligosaccharides in the cryoprotective medium having more than 9 glucose units is less than 20% w/w.

6. The method according to claim 1, wherein said isomaltooligosaccharides and hydrogenated isomaltooligosaccharides are dextran-based.

7. The method according to claim 1, wherein said cryoprotecting agent is in the form of a powder or in the form of a solution.

8. The method according to claim 1, wherein said cryoprotecting agent comprises from 30% to 70% w/w of said one or more cryoprotectants.

9. The method according to claim 1, wherein said cryoprotecting agent comprises an additional cryoprotectant, wherein said additional cryoprotectant is ethylene glycol.

10. The method according to claim 1, wherein said cryoprotecting agent comprises an additional cryoprotectant, wherein said additional cryoprotectant is albumin.

11. The method according to claim 1, wherein the sample consists of hematopoietic stem cells.

12. The method of claim 1, wherein the peripheral blood derived hematopoietic stem cells are CD34 positive blood stem cells.

13. The method of claim 1, further comprising
   (iii) thawing the sample after cryopreservation to generate a thawed sample;
   (iv) directly suspending the thawed sample in a culture medium; and
   (v) culturing the thawed sample in the culture medium, wherein the method does not include washing the thawed sample prior to suspending or prior to culturing the thawed sample in the culture medium.

14. The method according to claim 1, wherein said sample comprises in vitro cultured hematopoietic stem cells.

15. The method according to claim 1, wherein said sample is suitable for use in hematopoietic stem cells transplantation.

16. A method of protecting a sample from freezing damage, comprising the steps of:
   (i) bringing a sample comprising peripheral blood derived hematopoietic stem cells to be cryopreserved into contact with a cryoprotective medium comprising a cryoprotecting agent to obtain a cryopreservation composition;
   (ii) subsequently reducing the temperature of the cryopreservation composition to a cryopreservation temperature, where said cryoprotecting agent comprises one or more cryoprotectants selected from isomaltooligosaccharides and hydrogenated isomaltooligosaccharides,
   wherein said one or more cryoprotectants has a weight average molecular weight (Mw) of between 850 and 1,150 Da, the cryoprotective composition is substantially free of dimethyl sulfoxide (DMSO), and said cryoprotecting agent further comprises an additional cryoprotectant, which additional cryoprotectant is albumin, wherein said cryoprotective medium comprises no more than 8% w/w albumin.

17. The method according to claim 16, wherein said cryoprotective medium comprises from 1-8% albumin.

18. The method according to claim 16, wherein said cryoprotective medium comprises no more than 5% w/w albumin.

19. The method according to claim 16, wherein said cryoprotective medium comprises from 1-4% w/w albumin.

20. The method according to claim 16, wherein at least one of said one or more cryoprotectants has a polydispersity of ≥1 and ≤5.

21. The method according to claim 16, wherein said cryoprotectants selected from isomaltooligosaccharides and hydrogenated isomaltooligosaccharides consist of isomaltooligosaccharides having a weight average molecular weight (Mw) of between 850 and 1,150 Da.

22. The method according to claim 16, wherein said cryoprotectants selected from isomaltooligosaccharides and hydrogenated isomaltooligosaccharides consist of hydrogenated isomaltooligosaccharides having a weight average molecular weight (Mw) of between 850 and 1,150 Da.

23. The method according to claim 16, wherein the weight fraction of isomaltooligosaccharides in the cryoprotective medium having less than 3 glucose units is less than 15% w/w and/or wherein the weight fraction of isomaltooligosaccharides in the cryoprotective medium having more than 9 glucose units is less than 20% w/w.

24. The method according to claim 16, wherein said isomaltooligosaccharides and hydrogenated isomaltooligosaccharides are dextran-based.

25. The method according to claim 16, wherein said cryoprotecting agent is in the form of a powder or in the form of a solution.

26. The method according to claim 16, wherein said cryoprotecting agent comprises from 30% to 70% w/w of said one or more cryoprotectants.

27. The method according to claim 16, wherein the sample consists of hematopoietic stem cells.

28. The method according to claim 16, wherein the peripheral blood derived hematopoietic stem cells are CD34 positive blood stem cells.

29. The method according to claim 16, further comprising
   (iii) thawing the sample after cryopreservation to generate a thawed sample;

(iv) directly suspending the thawed sample in a culture medium; and
(v) culturing the thawed sample in the culture medium, wherein the method does not include washing the thawed sample prior to suspending or prior to culturing the thawed sample in the culture medium.

30. The method according to claim 16, wherein said sample comprises in vitro cultured hematopoietic stem cells.

31. The method according to claim 16, wherein said sample is suitable for use in hematopoietic stem cells transplantation.

\* \* \* \* \*